United States Patent
Zarifi

(10) Patent No.: US 12,407,465 B2
(45) Date of Patent: *Sep. 2, 2025

(54) METHODS AND APPARATUSES FOR CONFIGURATION OF SOUNDING REFERENCE SIGNAL FOR SERVING AND NEIGHBORING CELL MEASUREMENTS

(71) Applicant: Huawei Technologies Co., Ltd., Shenzhen (CN)

(72) Inventor: Keyvan Zarifi, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 297 days.

This patent is subject to a terminal disclaimer.

(21) Appl. No.: 17/813,966

(22) Filed: Jul. 21, 2022

(65) Prior Publication Data

US 2022/0360378 A1 Nov. 10, 2022

Related U.S. Application Data

(63) Continuation of application No. 16/989,759, filed on Aug. 10, 2020, now Pat. No. 11,502,800.
(Continued)

(51) Int. Cl.
*H04L 5/00* (2006.01)
*H04L 25/02* (2006.01)
(Continued)

(52) U.S. Cl.
CPC .......... *H04L 5/005* (2013.01); *H04L 25/0224* (2013.01); *H04W 24/06* (2013.01);
(Continued)

(58) Field of Classification Search
CPC ... H04L 5/005; H04L 25/0224; H04L 5/0048; H04L 5/0091; H04L 27/261;
(Continued)

(56) References Cited

U.S. PATENT DOCUMENTS 8,811,266 B2 8/2014 Choi et al.
2017/0006575 A1 1/2017 Cui et al.
(Continued)

FOREIGN PATENT DOCUMENTS

CN 105706385 A 6/2016
CN 109891819 A 6/2019
(Continued)

OTHER PUBLICATIONS

Huawei, "DL and UL Reference Signals for NR Positioning", 3GPP TSG RAN WG1 Meeting #96bis, R1-1904004, Apr. 8-12, 2019, 13 Pages, Xi'an, China.
(Continued)

*Primary Examiner* — Jungwon Chang
(74) *Attorney, Agent, or Firm* — Slater Matsil, LLP

(57) ABSTRACT

Methods and apparatuses are described for configuring a downlink (DL) reference signal (RS) for an electronic device (ED). Configuration information associated with the DL RS is received in a first communication from a location management function (LMF) via LTE positioning protocol (LPP). In a communication from a serving cell via radio resource control (RRC), an identifier (ID) of the DL RS and a cell ID of a cell that originates the DL RS are received. The configuration information received in the first communication also includes the ID of the DL RS and the cell ID. A sounding reference signal (SRS) is transmitted to the cell identified by the cell ID, according to path loss (PL) information or spatial domain transmission filter (TF) information associated with the DL RS.

20 Claims, 15 Drawing Sheets

Related U.S. Application Data

(60) Provisional application No. 62/886,145, filed on Aug. 13, 2019.

(51) Int. Cl.
| | | |
|---|---|---|
| *H04W 24/06* | (2009.01) | |
| *H04W 24/10* | (2009.01) | |
| *H04W 48/10* | (2009.01) | |
| *H04W 48/16* | (2009.01) | |
| *H04W 56/00* | (2009.01) | |
| *H04W 64/00* | (2009.01) | |

(52) U.S. Cl.
CPC ............ *H04W 24/10* (2013.01); *H04W 48/10* (2013.01); *H04W 48/16* (2013.01); *H04W 56/001* (2013.01); *H04W 64/003* (2013.01)

(58) Field of Classification Search
CPC ..... H04W 24/06; H04W 24/10; H04W 48/10; H04W 48/16; H04W 56/001; H04W 64/003; H04W 48/12
USPC .......................................................... 370/329
See application file for complete search history.

(56) References Cited

U.S. PATENT DOCUMENTS

| | | | |
|---|---|---|---|
| 2018/0343635 A1 | 11/2018 | Edge et al. | |
| 2019/0075543 A1 | 3/2019 | Kim et al. | |
| 2019/0223140 A1 | 7/2019 | Grossmann et al. | |
| 2020/0382978 A1* | 12/2020 | Manolakos | H04B 17/309 |
| 2021/0410077 A1 | 12/2021 | Guo | |
| 2023/0079502 A1* | 3/2023 | Cha | H04B 17/328 |
| | | | 370/252 |

FOREIGN PATENT DOCUMENTS

| | | |
|---|---|---|
| CN | 110062457 A | 7/2019 |
| WO | 2018128409 A1 | 7/2018 |

OTHER PUBLICATIONS

Qualcomm Incorporated, "Summary #2 of 7.2.10.4: PHY procedures for positioning measurements", 3GPP TSG-RAN WG1 Meeting #97, R1-1907841, May 13-17, 2019, 17 Pages, Reno, Nevada.
Session Chair (Mediatek)", Report from session on Rel-15 LTE Positioning, Rel-15 and 16 NR Positioning", 3GPP TSG-RAN WG2 Meeting #106, R2-1908106, May 13-17, 2019, 13 Pages, Reno, Nevada.
"3rd Generation Partnership Project; Technical Specification Group Radio Access Network; Evolved Universal Terrestrial Radio Access (E-UTRA); LTE Positioning Protocol (LLP) (Release 15)", 3GPP TS 36.355, V15.4.0, Technical Specification, Jun. 2019, 224 Pages.
"3rd Generation Partnership Project; Technical Specification Group Radio Access Network; NG Radio Access Network (NG-RAN); Stage 2 functional specification of User Equipment (UE) positioning in NG-RAN (Release 15)", 3GPP TS 38.305, V15.4.0, Technical Specification, Jun. 2019, 72 Pages.
CATT, "UE and gNB measurements for NR Positioning", 3GPP TSG RAN WG1 #97, R1-1906307, May 13-17, 2019, 11 Pages, Reno, USA.
Qualcomm Incorporated, "DL and UL NR Positioning Procedures", 3GPP TSG-RAN WG2 Meeting #106, R2-1906779, Revision of R2-1903135, May 13-17, 2019, 8 Pages, Reno, Nevada, USA.
Vivo, "Discussion on physical-layer procedures for UE/gNB measurements", 3GPP TSG RAN WG1 #97, R1-1906180, May 13-17, 2019, 6 Pages, Reno, USA.
Huawei, "DL and UL Reference Signals for NR Positioning", 3GPP TSG RAN WG1 Meeting #96bis, R1-1904004, Apr. 8-Apr. 12, 2019, 13 Pages, Xi'an, China.

* cited by examiner

METHODS AND APPARATUSES FOR CONFIGURATION OF SOUNDING REFERENCE SIGNAL FOR SERVING AND NEIGHBORING CELL MEASUREMENTS

CROSS-REFERENCE TO RELATED APPLICATIONS

This application is a continuation of U.S. patent application Ser. No. 16/989,759, entitled "Methods and Apparatuses for Configuration of Sounding Reference Signal for Serving and Neighboring Cell Measurements," filed Aug. 10, 2020, now U.S. Pat. No. 11,502,800 issued on Nov. 15, 2022, which claims priority from U.S. provisional patent application No. 62/886,145, entitled "Methods and Apparatuses for Configuration of Sounding Reference Signal for Serving and Neighboring Cell Measurements," filed Aug. 13, 2019, the applications of which are hereby incorporated by reference in their entireties.

TECHNICAL FIELD

The present disclosure relates generally to wireless communications. In various examples, the present disclosure is related to methods and apparatuses for configuration of sounding reference signal power.

BACKGROUND

In conventional cellular networks, each cell is associated with a coverage area and includes one or more base stations (BSs) (also referred to as transmit-receive points (TRPs)), each having a radio frequency (RF) transceiver for transmitting and receiving wireless signals. Each cell is assigned a physical cell identifier (PCID) that may be common among all BSs within the cell. The PCID in part facilitates control channel and data channel communications from the cell to an electronic device (ED) (e.g., a user equipment (UE)) and from the ED to the cell. The cell that is presently serving an ED is referred to as the serving cell for that ED. The network may maintain the association between the serving cell and the ED, through an assigned PCID, until a handover is triggered.

The network may implement a location management function (LMF), which provides location services such as determining the location of an ED (also referred to as "positioning" of the ED) based on the received measurements from other entities in the network such as cells (including serving and non-serving cells) and/or the ED. The LMF may be implemented in a cell (e.g., LMF services may be provided by a BS of the cell), or may be implemented in the core network, for example.

An ED transmits a sounding reference signal (SRS) that can be used by a network side device to determine channel characteristics about the channel between the ED and the network device. In Release 15 (Rel. 15) New Radio (NR), the use of SRS is performed with regard to a network side device that is presently serving the ED. That is, the SRS is currently intended to be received and measured only by the serving cell.

It would be desirable to provide solutions that enable the ED to transmit a SRS that is intended to be received by other than the serving cell. Such solutions may enable the SRS to be used for positioning purposes, for example at the LMF, or for inter-cell or intra-cell mobility purposes.

SUMMARY

In various examples disclosed herein, solutions are provided for configuration of SRS power, to enable transmission of a SRS from the ED to a non-serving cell (e.g., a neighboring cell).

The present disclosure describes examples for configuration of a path loss (PL) reference signal (RS), which may be sent to the ED by a serving cell or by the LMF. The PL RS may be in the form of a PL positioning reference signal (PRS), a PL synchronization signal/physical broadcast channel block (SSB) or a PL channel state information-reference signal (CSI-RS), for example.

The present disclosure also describes examples for configuration of a transmission filter (TF) RS, which may be sent to the ED by a serving cell or by the LMF. The TF RS may be in the form of a TF PRS, a TF SSB or a TF CSI-RS, for example.

In various examples, the present disclosure describes possible fallback procedures that may be used if the ED does not receive or detect an expected PL CSI-RS, TF CSI-RS, PL PRS, or TF PRS.

In various examples, the present disclosure describes possible procedures that enable the ED to receive the configuration of PL RS or TF RS from the LMF, and that enable the LMF to acquire PL RS or TF RS configuration details.

The present disclosure also describes examples that enable a serving cell to acquire PL RS or TF RS configuration details from a non-serving cell, from the LMF, or from a non-serving cell, via, for example, the LMF.

The various examples described herein may help to enable the ED to properly receive DL RS from a cell (including a serving cell or a non-serving cell), and to determine PL and/or TF for transmission of a SRS to a cell (including a serving cell or a non-serving cell). These examples may enable the SRS to be used for mobility purposes, positioning purposes, or any other application that may require the ED to transmit SRS to a cell (including a serving cell or a non-serving cell).

In some example aspects, the present disclosure describes a method at a network entity implementing a location management function (LMF). The method includes: receiving, from a radio access network (RAN) node, a configuration message containing configuration information associated with a downlink (DL) reference signal (RS); and transmitting the configuration information to at least one of: an electronic device (ED), the configuration information enabling the ED to use the DL RS to obtain path loss (PL) information or spatial domain transmission filter (TF) information for the purpose of transmitting a sounding reference signal (SRS); or a serving RAN node serving the ED.

In any of the examples, the method may include: transmitting to the RAN node a request for the configuration information.

In any of the examples, the request may be transmitted to the RAN node via New Radio Positioning Protocol A (NRPPa).

In any of the examples, the DL RS may be a DL synchronization signal/physical broadcast channel block (SSB) or a DL positioning reference signal (PRS).

In any of the examples, the configuration message may be received from a non-serving RAN node via New Radio Positioning Protocol A (NRPPa), and the configuration information is transmitted to the serving RAN node via NRPPa.

In any of the examples, the configuration information may be transmitted to the ED via LTE positioning protocol (LPP).

In any of the examples, the configuration information may include a quasi colocation-Type D (QCL-D) field providing information about another configured reference signal that is QCL-D with the DL RS. The ED may be enabled to detect the DL RS based on a configuration for the other configured reference signal.

In some example aspects, the present disclosure describes a method at an electronic device (ED). The method includes: receiving configuration information associated with a downlink (DL) reference signal (RS) in a first communication from a location management function (LMF) via LTE positioning protocol (LPP); receiving, in a second communication from a serving cell for the ED via radio resource control (RRC), an identifier (ID) of the DL RS and a cell ID of a cell that originates the DL RS, wherein the configuration information received in the first communication also includes the ID of the DL RS and the cell ID; and transmitting a sounding reference signal (SRS) to the cell identified by the cell ID, according to path loss (PL) information or spatial domain transmission filter (TF) information associated with the DL RS.

In any of the examples, the DL RS may be a DL positioning reference signal (PRS), and the configuration information associated with the DL RS may include one or more of: a resource ID of the DL PRS; the cell ID of the cell that originates the DL PRS; a quasi colocation-Type-D (QCL-D) field providing information about another configured reference signal that is QCL-D with the DL PRS; a New Radio Absolute Radio-Frequency Channel Number (NR ARFCN) for determining a frequency domain location of the DL PRS; a bandwidth of the DL PRS; a slot offset of the DL PRS; a frame offset of the DL PRS; a symbol offset of the DL PRS; a muting configuration of the DL PRS; a periodicity and offset of the DL PRS; and a scrambling ID of the DL PRS.

In any of the examples, the DL RS may be a DL synchronization signal/physical broadcast channel block (SSB), and the configuration information associated with the DL RS may include one or more of: a SSB index of the DL SSB; the cell ID of the cell that originates the DL SSB; and one or more parameters locating the DL SSB in time-frequency domain.

In any of the examples, the configuration information associated with the DL RS may enable the ED to use the DL RS for information other than PL and spatial domain TF, and the later second communication may enable the ED to use the DL RS for PL information or spatial domain TF information.

In any of the examples, the configuration information associated with the DL RS may enable the ED to use the DL RS for PL information or spatial domain TF information.

In any of the examples, the DL RS may be a DL positioning reference signal (PRS), and the configuration information associated with the DL RS may include one or more of: a resource ID of the DL PRS; the cell ID of the cell that originates the DL PRS; a quasi colocation-Type-D (QCL-D) field providing information about another configured reference signal that is QCL-D with the DL PRS; a New Radio Absolute Radio-Frequency Channel Number (NR ARFCN) for determining a frequency domain location of the DL PRS; a bandwidth of the DL PRS; a slot offset of the DL PRS; a frame offset of the DL PRS; a symbol offset of the DL PRS; a muting configuration of the DL PRS; a periodicity and offset of the DL PRS; and a scrambling ID of the DL PRS.

In any of the examples, the DL RS may be a DL synchronization signal/physical broadcast channel block (SSB), and the configuration information may include one or more of: a SSB index of the DL SSB; the cell ID of the cell that originates the DL SSB; and one or more parameters locating the DL SSB in time-frequency domain In some example aspects, the present disclosure describes a method at an electronic device (ED). The method includes: obtaining, by the ED, path loss (PL) information based on a second downlink (DL) reference signal (RS) after a first DL RS has not been received during an expected time or timeframe, or in absence of configuration information for receiving the first DL RS; and transmitting a sounding reference signal (SRS), the SRS being transmitted according to the PL information.

In any of the examples, the second DL RS may be a synchronization signal/physical broadcast channel block (SSB) used by the ED to obtain a MasterInformationBlock (MIB) parameter, and may be later used by the ED to obtain the PL information.

In some example aspects, the present disclosure describes an apparatus including a processing unit. The processing unit is configured to execute instructions to cause the apparatus to perform any of the methods described above.

In some example aspects, the present disclosure describes a computer-readable medium storing instructions which, when executed by a processing unit of an apparatus, cause the apparatus to perform any of the methods described above.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DETAILED DESCRIPTION OF ILLUSTRATIVE EMBODIMENTS

Figure 1:
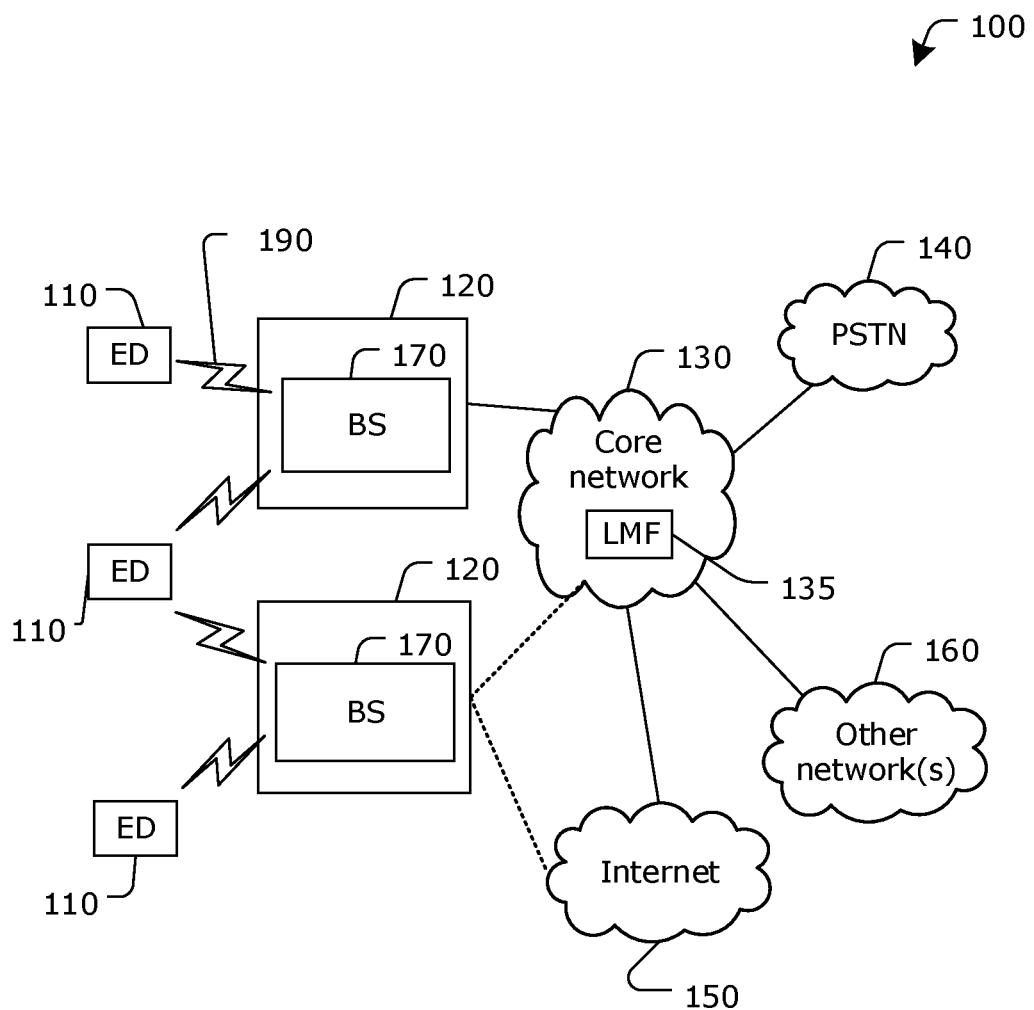
FIG. 1 is a schematic diagram of an example communication system suitable for implementing examples described herein.

In Release 15 (Rel. 15) New Radio (NR), procedures that have been accepted into the NR standard do not provide for measurement of a sounding reference signal (SRS) by a non-serving cell. Examples described herein may aid in implementing SRS measurement by non-serving cells (e.g., neighboring cells) as well as serving cells. The solutions described herein may facilitate usage of SRS for, for example, positioning of an electronic device (ED) (e.g., a user equipment (UE)) or uplink (UL)-based inter-cell or intra-cell mobility among other possible applications.

In various examples, the present disclosure describes methods and mechanisms that may be based on modification of some known methodologies. Modifying existing methods may allow for easier implementation with existing methods and/or easier adoption across the industry.

In order to enable SRS measurement by a non-serving cell, there are several issues that may need to be addressed with respect to the conventional SRS measurement, which only relies on the serving cell.

One issue relates to enabling the ED to transmit an SRS to a transceiver that is not associated with the serving cell. In other words, the ED should be able to transmit an SRS to a non-serving cell. In order to be able to use beamforming to transmit an SRS to a non-serving cell, the ED should be provided with SRS configuration parameters that include a collection of transmission variables that define or control the transmitted SRS signal. These transmission variables include, for instance, variables pertaining to spatial domain transmission filter, path loss, transmission power, SRS periodicity and resource mapping. In particular, the SRS spatial domain transmission filter (TF) defines the directionality of the signal (e.g., beamforming parameters) and enables the ED to send the SRS in a direction that can be received by the non-serving cell.

Conventionally, the ED is able to determine the SRS spatial domain TF for a BS of a serving cell based on a first reference signal (RS) that is transmitted by the serving cell. This first RS may inform the ED about transmission variables pertaining to spatial domain TF and/or path loss (PL).

Conventionally, the ED can listen for the first RS from the BS of the serving cell using receive beams. Based on configuration information provided to the ED regarding where in the time-frequency resource the serving cell is sending the first RS, the ED can determine where the signal is strongest and associate that direction with the BS of the serving cell. For example, this configuration may involve using a "SRS-SpatialRelationInfo" field in the "SRS-Resource" field of a "SRS-Config" message. The RS can be one of: 1) SS/PBCH block (synchronization signal/physical broadcast channel block) (SSB) resource; 2) channel state information reference signal (CSI-RS) resource; 3) sounding reference signal (SRS) resource.

In the case of "SRS-spatialRelationInfo" is used as in the current 3GPP standard, the content of the field is SRS resource specific and includes a servingCellId, and one of the following three reference signal indicators: 1) SSB index; or 2) CSI-RS resource index; or 3) SRS Resource index, and a corresponding uplink bandwidth part (UL BWP).

According to the current standard, if the configured RS transmitted by the serving cell is a SSB or CSI-RS resource, then the ED shall transmit the target SRS resource with a same spatial domain transmission filter that was used for the reception of the SSB or CSI-RS. If the RS is another SRS resource, then the ED may transmit the target SRS resource with a same spatial domain transmission filter used for the transmission of the indicated SRS.

RSs for determining the spatial transmission filter of SRS according to the Rel. 15 NR 3GPP standard are configured by a serving cell, and are transmitted from the BS(s) of a serving cell. A problem with this with regard to SRS measurement by a non-serving cell is that when the SRS needs to be received by a BS in a non-serving cells, configuring the SRS transmission based on a RS from the serving cell may not be adequate.

In examples described herein, a transmission filter RS (TF RS) is used for determining the spatial domain transmission filter. A TF RS resource is used for determining the spatial domain transmission filter of the target SRS resource. Four TF RS resources are applicable: SSB resource used as a TF RS (called, for the sake of brevity, here as TF SSB), CSI-RS resource used as a TF RS (called, for the sake of brevity, here as TF CSI-RS), downlink (DL) positioning reference signal (PRS) (called, for the sake of brevity, here as TF PRS) and SRS resource (called, for the sake of brevity, here as TF SRS). In this disclosure, the configuration of some DL TF RSs are described, namely, TF SSB, TF CSI-RS, and TF PRS.

An issue of the conventional method of SRS configuration relates to determining the transmission power that the ED should use to send the SRS signal. In Rel 15 of the 3GPP standard, the SRS transmission power is determined using the following formula:

$$P_{SRS,b,f,c}(i, q_s, l) = A_1 = \min\left\{ \begin{array}{c} P_{CMAX,f,c}(i) \\ \underbrace{P_{o\_SRS,b,f,c}(q_s) + 10\log_{10}(2^{\mu} \cdot M_{SRS,b,f,c}(i)) + \alpha_{SRS,b,f,c}(q_s) \cdot PL_{b,f,c}(q_d)}_{\text{Open loop component}} + \underbrace{h_{b,f,c}(i, l)}_{\text{closed loop component}} \end{array} \right.$$

Where:

$P_{SRS,b,f,c}(i, q_s, l)$ is the total transmit power of a SRS in dBm over one SRS symbol in SRS resource set $q_s$ across all ports for UL bandwidth part (BWP) b of carrier f of serving cell c, in power control (PC) adjustment state with index l, and in SRS transmission occasion i. The transmit power in this representation is split equally across all configured ports.

$P_{CMAX,f,c}(i)$ is the maximum output power of the ED, that is defined in specifications (RAN4 (TS 38.101-1/38.101-2)).

$P_{o\_SRS,b,f,c}(q_s)$ is a higher layer configured baseline power value per SRS resource set $q_s$.

$M_{SRS,b,f,c}(i)$ is the SRS bandwidth (BW) in resource blocks (RBs) per SRS resource.

$\alpha_{SRS,b,f,c}(q_s)$ is a higher layer configured scaling factor per SRS resource set $q_s$, and having the default value of 1.

$PL_{b,f,c}(q)$ is a DL PL estimate in dB, and is calculated by the ED based on the RS resource index $q_d$. In Rel 15, the RS resource index $q_d$ is provided by the higher layer parameter pathloss reference RS (pathlossReferenceRS) associated with the SRS resource set $q_s$. This RS that is used for this determination of the DL PL may be referred to as a PL RS. In Rel. 15, two PL RS resources are applicable: PL SSB and PL CSI-RS resource. In the current 3GPP standard, if the ED is not provided a PL RS resource (e.g., higher layer parameter pathlossReferenceRS in 3GPP TS38.331) or the ED has not yet been provided dedicated higher layer parameters, the ED calculates $PL_{b,f,c}(q_d)$ using a RS resource obtained from the SS/PBCH block that the ED uses to obtain higher layer parameter MasterInformationBlock (MIB). As can be observed, the conventional PL RS is used to calculate PL to the serving cell which, itself, is used to determine the SRS transmission power that is required for SRS signal be received at the serving cell with enough power so the SRS can be measured properly.

$h_{b,f,c}(i, l)$ is a PC adjustment state with index l in SRS transmission occasion i.

According to the conventional power control mechanism, the SRS power control is per SRS resource set and all SRS resource sets are configured for (meant to be measured at) the serving cell. In order to enable SRS measurement by a non-serving cell, there is a need for a solution that enables configuration of different SRS resource sets, each of which is meant to be measured by a serving cell, non-serving cell.

According to the Rel. 15 3GPP standard, a PL RS resource is configured and transmitted from the serving cell. Transmitting the PL RS from only the serving cell results in a problem for SRS measurement by a non-serving cell, because the PL RS cannot be used to calculate the PL of a SRS resource for a non-serving cell. In particular, a non-serving cell is typically located farther than the serving cell with respect to the ED and, as a result, experience a larger PL. If the UE uses the PL RS that is configured and transmitted from the serving cell to calculate the transmit power for a SRS that is intended for the non-serving cell, the SRS may not be transmitted with enough power for the non-serving cell to accurately detect and measure the SRS.

In order to enable the SRS to be received by a non-serving cell (e.g., for positioning or mobility purposes) a DL RS from a non-serving cell should be configured to be used as a DL PL RS, for the purpose of SRS power control. As mentioned above, the DL PL RS may be in the form of a CSI-RS, a SSB, or DL positioning reference signal (PRS), for example. It would also be desirable for there to be a fallback procedure in the event the ED is not able to obtain the PL RS.

For enabling UL beam management/alignment towards a non-serving cell, there should be configuration of a spatial relation between a reference DL RS from a non-serving cell and the target SRS. The reference DL RS can be in the form of a SSB, a CSI-RS, or DL-PRS, for example.

It should be noted that these configurations, which enable transmission of the SRS to a non-serving cell may be in addition to existing Rel 15 specifications. That is, these configurations do not necessarily exclude the possibility of the ED transmitting the SRS to be received by the serving cell.

In the present disclosure, the reference DL RS used for spatial relation between a non-serving cell (or serving cell) and SRS may be referred to as a TF RS for the sake of brevity. Moreover, TF SSB is used to refer to a SSB that is used as TF RS; TF CSI-RS is used to refer to a CSI-RS that is used as TF RS; and TF PRS is used to refer to a PRS that is used as TF RS.

In the present disclosure, the PL reference RS pathloss-ReferenceRS may be referred to as a PL RS for the sake of brevity. Moreover, PL SSB is used to refer to a SSB that is used as PL RS; PL CSI-RS is used to refer to a CSI-RS that is used as PL RS; and PL PRS is used to refer to a PRS that is used as PL RS.

The present disclosure provides examples that address one or more of the challenges described above. It should be understood that examples that are described with reference to the configuration of PL RS may also be adapted for configuration of the TF RS (and vice versa).

In embodiments of the present disclosure, CSI-RS resources from the serving and/or the neighboring cells may be supported to be used as the spatialRelationInfo RS for the positioning SRS. CSI-RS transmit beams are UE-specific and typically narrower than the SSB transmit beams and, as such, are better candidates for the spatialRelationInfo RS in general. For mobility purposes, A UE can be configured in MeasObjectNR to measure multiple groups of CSI-RS resources where each group is transmitted from a serving or a neighbouring cell. If some of these neighbouring cells are also the target cells in the UL-based positioning, their configured CSI-RS resources in MeasObjectNR are known at the UE and can be directly indicated to the UE as the spatialRelationInfo RS for the positioning SRS.

The embodiments of the present disclosure, the DL PRS from the serving and/or the neighbouring cells may be indicated as a spatialRelationInfo RS for the positioning SRS. If UE is configured to measure DL PRS from the serving and/or the neighbouring cells for, e.g., the DL-based or multi-RTT positioning, as long as the configuration is valid, the configured DL PRS can also be indicated to the UE to be used for any other purposes. This includes the use of the configured DL PRS as a spatialRelationInfo RS for the positioning SRS. In the multi-RTT positioning solution, the RTF is measured between a UE-gNB pair: the gNB that transmits DL PRS for the "UE Rx-Tx time difference measurement" is the recipient of the SRS for the "gNB Rx-Tx time difference measurement" from the same UE. As such, it is logical to have a spatial relation between the DL PRS for the "UE Rx-Tx time difference measurement" and the corresponding SRS for the "gNB Rx-Tx time difference measurement". This can be realized by indicating the DL PRS as a spatialRelationInfo RS for the corresponding SRS.

It is supported that in the embodiments of the present disclosure the configuration of CSI-RS and/or DL-PRS from the serving and/or the neighboring cells as a spatialRelationInfo RS for the positioning SRS. For positioning purposes, in addition to SSB, support configuring CSI-RS and DL-PRS from the serving and the neighboring cells as a spatialRelationInfo RS.

In the embodiment of the present disclosure, some parameters are required to uniquely identify the spatialRelationInfo RS. In general, and considering the fact that the spatialRelationInfo RS can be from the neighboring cells, spatialRelationInfo RS configuration may indicate all parameters that are required to detect a DL RS. This, depending on the DL RS type (SSB, CSI-RS, or DL PRS), includes reference time and frequency points, time and frequency domain resource mapping parameters, periodicity and offset, PCID, resource ID, scrambling ID, and possibly QCL-D properties. It may be possible to configure the spatialRelationInfo RS from the set of DL RSs that are already detected by the UE and/or configured to the UE for potentially other purposes. This includes the detected SSBs from the serving or neighboring cells during, for instance, the initial access, configured CSI-RS resource from the serving cell, configured SSBs or CSI-RS resources in MeasObjectNR from the serving or neighboring cells, or configured DL PRS resources for the RSTD or the UE Rx-Tx time difference measurements. In such a case, to uniquely identify the spatialRelationInfo RS, it is required to indicate to the UE the DL RS resource ID and the PCID of the corresponding serving or neighboring cell. Note that, for instance in the case of CSI-RS, (non-zero power) CSI-RS resources are configured in two different locations in Rel. 15: CSI-RS resources from the serving and neighboring cells for the purpose of mobility are configured in CSI-RS-ResourceConfigMobility and indexed by CSI-RS-Index and CSI-RS resources from only the serving cell for various in-cell measurement purposes are configured in NZP-CSI-RS-Resource and indexed by NZP-CSI-RS-ResourceId. If the spatialRelationInfo CSI-RS is indicated from the set of DL RSs that are already known (configured) to the UE, the CSI-RS resource ID should refer to the CSI-RS-Index used in CSI-RS-ResourceConfigMobility at least in the case that the target cell is a neighboring cell.

In one embodiment, parameters maybe added in the spatialRelationInfo field to be able to additionally indicate a SSB or CSI-RS from a neighboring cell, or a DL PRS from a serving or a neighboring cell. A LMF may send the configurations of the serving and neighboring cells' DL PRS resources to the UE using LPP and the serving cell is transparent to the DL PRS configurations of the neighboring cells. If the DL PRS that is used as a spatialRelationInfo RS is already configured to the UE by the LMF for, e.g., the RSTD or the UE Rx-Tx time difference measurements, the serving cell only needs to indicate the DL PRS resource ID and the PCID of the corresponding cell to configure the DL PRS as the spatialRelationInfo RS in SRS-Config IE in RRC. The DL PRS resource ID and the PCID of the neighboring cell can be provided by the LMF to the serving cell using NRPPa. The spatialRelationInfo RS is configured in RRC and the spatialRelationInfo RS configuration at least includes the DL reference signal (SSB, CSI-RS, or DL-PRS) resource ID and the Cell ID of the transmitting serving/neighboring cell.

In some embodiments of the present disclosure, considering the fact that the spatialRelationInfo RS may be transmitted from the neighboring cells, it is supported that some UE fallback behavior in the case that a spatialRelationInfo RS is configured but is not detected. If a cell transmits a spatialRelationInfo RS but this spatialRelationInfo RS is not detected by the UE, a reasonable approach would be using a detected DL RS from the same cell as the fallback spatialRelationInfo RS. If the cell is a serving cell, the fallback spatialRelationInfo RS can be the SSB used to obtain MIB and if the cell is a neighboring cell, the fallback spatialRelationInfo RS can be the detected SSB from that cell with the highest RSRP. Thus, if a spatialRelationInfo RS is configured but not detected, UE uses the following as a substitute spatialRelationInfo RS: if the cell that transmits the spatialRelationInfo RS is a serving cell, the substitute spatialRelationInfo RS is the SSB used to obtain MIB, or if the cell that transmits the spatialRelationInfo RS is a neighboring cell, the substitute spatialRelationInfo RS is the detected SSB from that cell with the highest RSRP.

If a spatialRelationInfo RS is not configured, it is up to the UE how to form the SRS transmit beam. For instance, if none of the SRS resources in a SRS resource set is configured with a spatialRelationInfo RS, UE may transmit the SRS resources using transmit beam sweeping.

In embodiments of the present disclosure, the SSB and/or CSI-RS from the serving and/or neighboring cells may be configured as a pathlossReferenceRS. A UE can be configured in MeasObjectNR to measure SSBs from the serving and/or neighbouring cells during the periodic SMTC windows and/or CSI-RS resources from the serving and neighbouring cells. The performed measurements include SS-RSRP and CSI-RSRP (RSRP measurement on CSI-RS). In one example, once RSRP is calculated, obtaining the pathloss is straightforward as pathloss is given by the transmit power minus RSRP. For positioning purposes, support configuring SSB and CSI-RS from the serving and the neighboring cells as a pathlossReferenceRS.

The indication of spatialRelationInfo RS as above also apply indicating the pathlossReferenceRS to UE: pathlossReferenceRS from the serving or neighboring cells may be indicated in RRC signaling or message and at least the reference signal resource ID and the Cell ID of the transmitting serving or neighboring cell are required to enable the UE to uniquely identify the pathlossReferenceRS. The pathlossReferenceRS is configured in RRC and the pathlossReferenceRS configuration at least includes the DL reference signal (SSB or CSI-RS) resource ID and the Cell ID of the transmitting serving/neighboring cell.

In positioning, the SRS target cell may be a neighboring cell. In such a case, a different fallback behavior may be defined when the pathlossReferenceRS is not configured or is configured but not detected. If a pathlossReferenceRS is not configured or is configured but not detected, the UE may use the following detected SSB from the target cell as pathlossReferenceRS: if the target cell is a serving cell, the substitute pathlossReferenceRS is the SSB used to obtain MIB; or if the target cell is a neighboring cell, the substitute pathlossReferenceRS is the SSB with the highest RSRP. Alternatively, if pathlossReferenceRS is configured but not detected or if pathlossReferenceRS is configured but not detected and additionally no SSB from the corresponding target cell is detected, UE transmits the SRS with the maximum power.

Figure 2A:
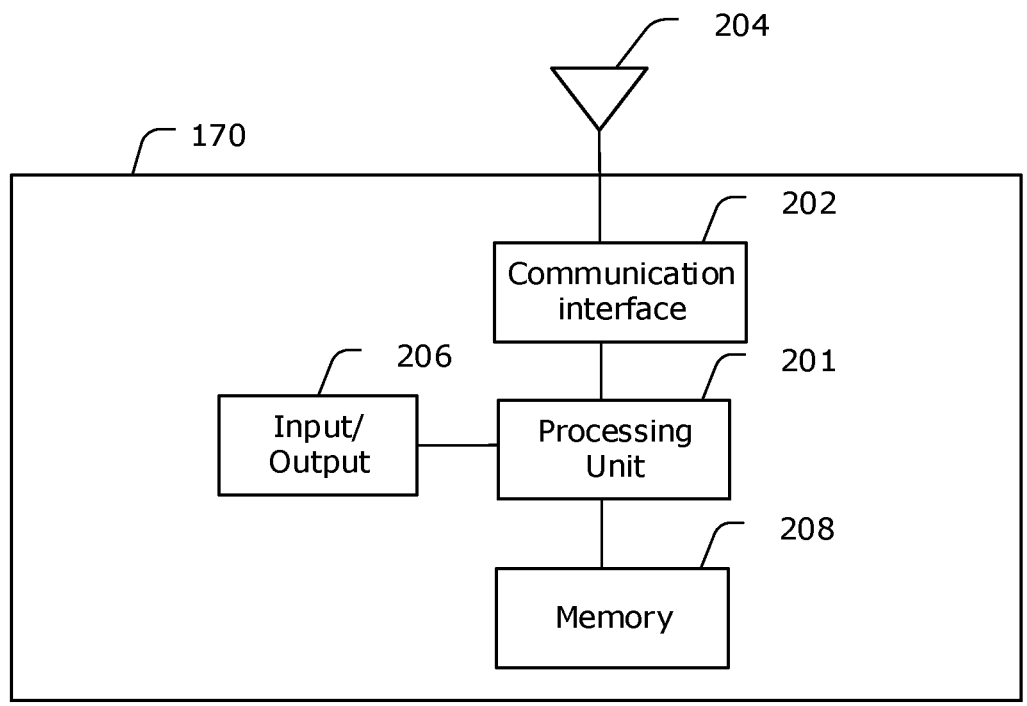
FIGS. 2A and 2B are block diagrams showing an example base station (BS) and an example electronic device (ED), respectively, suitable for implementing examples described herein.
Figure 2B:
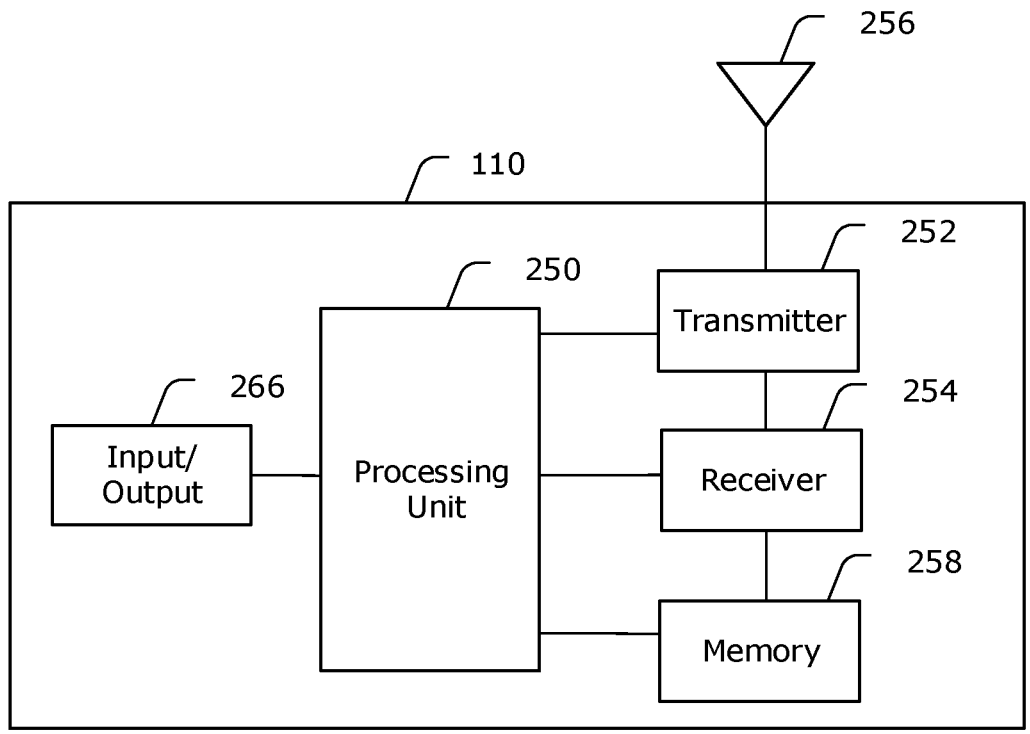
Figure 3:
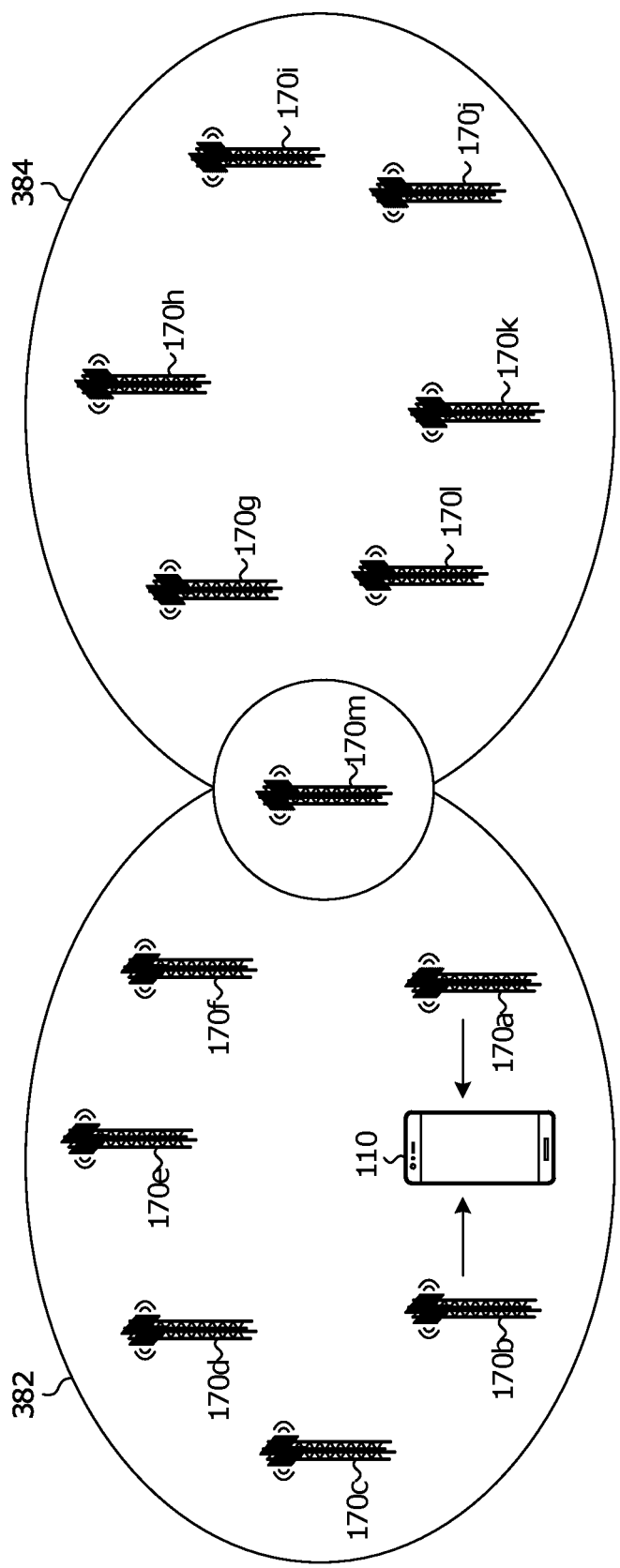
FIG. 3 is a schematic diagram illustrating two neighboring cells of an example communication system, suitable for implementing examples described herein.

To assist in understanding the present disclosure, FIGS. 1-3 are first described. FIGS. 1-3 provide examples of the network, system and devices that may be used to implement examples described in the present disclosure.

FIG. 1 illustrates an example wireless communication system 100 (also referred to as wireless system 100) in which embodiments of the present disclosure could be implemented. In general, the wireless system 100 enables multiple wireless or wired elements to communicate data and other content. The wireless system 100 may enable content (e.g., voice, data, video, text, etc.) to be communicated (e.g., via broadcast, narrowcast, user device to user device, etc.) among entities of the system 100. The wireless system 100 may operate by sharing resources such as bandwidth. The wireless system 100 may be suitable for wireless communications using 5G technology and/or later generation wireless technology. In some examples, the wireless system 100 may also accommodate some legacy wireless technology (e.g., 3G or 4G wireless technology).

In the example shown, the wireless system 100 includes EDs 110, radio access networks (RANs) 120, a core network 130, a public switched telephone network (PSTN) 140, the internet 150, and other networks 160. In some examples, one or more of the networks may be omitted or replaced by a different type of network. Other networks may be included in the wireless system 100. Although certain numbers of these components or elements are shown in FIG. 1, any reasonable number of these components or elements may be included in the wireless system 100.

The EDs no are configured to operate, communicate, or both, in the wireless system 100. For example, the EDs no may be configured to transmit, receive, or both via wireless or wired communication channels. Each ED no represents any suitable end user device for wireless operation and may include such devices (or may be referred to) as a user equipment (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, an internet of things (IoT) device, or a consumer electronics device, among other possibilities. Future generation EDs no may be referred to using other terms.

In FIG. 1, the RANs 120 include BSs 170. Although FIG. 1 shows each RAN 120 including a single respective BS 170, it should be understood that any given RAN 120 may include more than one BS 170, and any given RAN 120 may also include base station controller(s) (BSC), radio network controller(s) (RNC), relay nodes, elements, and/or devices. Each BS 170 is configured to wirelessly interface with one or more of the EDs no to enable access to any other BS 170, the core network 130, the PSTN 140, the internet 150, and/or the other networks 160. For example, the BSs 170 may also be referred to as (or include) a base transceiver station (BTS), a radio base station, a Node-B (NodeB), an evolved NodeB (eNodeB or eNB), a Home eNodeB, a gNodeB (gNB) (sometimes called a next-generation Node B), a transmission point (TP), a transmission/reception point (TRP), a site controller, an access point (AP), or a wireless router, among other possibilities. In some examples, the RAN 120 may be a Next Generation (NG) RAN, and the BS 170 may be referred to as a NG-RAN node. In such cases, the BS 170 may be a gNB or a NG-eNB (which is an eNB that is connected to the NG core network via a NG interface). Future generation BSs 170 may be referred to using other terms. Any ED 110 may be alternatively or additionally configured to interface, access, or communicate with any other BS 170, the internet 150, the core network 130, the PSTN 140, the other networks 160, or any combination of the preceding. In some examples, a BS 170 may access the core network 130 via the internet 150.

The EDs 110 and BSs 170 are examples of communication equipment that can be used to implement some or all of the functionality and/or embodiments described herein. Any BS 170 may be a single element, as shown, or multiple elements, distributed in the corresponding RAN 120, or otherwise. Each BS 170 transmits and/or receives wireless signals within a particular geographic region or area, sometimes referred to as a "cell" or "coverage area". A cell may be further divided into cell sectors, and a BS 170 may, for example, employ multiple transceivers to provide service to multiple sectors. In some embodiments there may be established pico or femto cells where the radio access technology supports such. A macro cell may encompass one or more smaller cells. In some embodiments, multiple transceivers could be used for each cell, for example using multiple-input multiple-output (MIMO) technology. The number of RANs 120 shown is exemplary only. Any number of RANs 120 may be contemplated when devising the wireless system 100.

The BSs 170 communicate with one or more of the EDs 110 over one or more Uu wireless interfaces 190 (e.g., via radio frequency (RF), microwave, infrared (IR), etc.). The Uu interface 190 may also be referred to as a Uu link, Uu connection, ED-BS link/connection/interface, or ED-network link/connection/interface, for example. The EDs 110 may also communicate directly with one another (i.e., without involving the BS 170) via one or more sidelink (SL) wireless interfaces 195. The SL interface may also be referred to as a SL connection, ED-ED link/connection/interface, device-to-device (D2D) link/connection/interface, or simply as SL, for example. The wireless interfaces 190, 195 may utilize any suitable radio access technology. For example, the wireless system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) for wireless communications.

The RANs 120 are in communication with the core network 130 to provide the EDs 110 with various services such as voice, data, and other services. The RANs 120 and/or the core network 130 may be in direct or indirect communication with one or more other RANs (not shown), which may or may not be directly served by core network 130, and may or may not employ the same radio access technology. The core network 130 may also serve as a gateway access between (i) the RANs 120 or EDs 110 or both, and (ii) other networks (such as the PSTN 140, the internet 150, and the other networks 160). The core network 130 may also provide services. For example, in the example of FIG. 1 the LMF 165 is implemented in the core network 130 (e.g., at a backend server, or at a dedicated location management unit). In other examples, the LMF 165 may be implemented outside of the core network 130, for example at a BS 170. In the present disclosure, reference may be made to the LMF 165 as a shorthand for the network entity in which the LMF 165 is implemented. For example, the present disclosure may describe a message being transmitted to or from the LMF 165; in such instances, it should be understood that what is meant is that the message is being transmitted to or from the network entity (e.g., in the core network 130 or a BS 170) in which the LMF 165 is implemented.

In addition, some or all of the EDs no may include functionality for communicating with different wireless networks over different wireless links using different wireless technologies and/or protocols. Instead of wireless communication (or in addition thereto), the EDs no may communicate via wired communication channels to a service provider or switch (not shown), and to the internet 150. PSTN 140 may include circuit switched telephone networks for providing plain old telephone service (POTS). The internet 150 may include a network of computers and subnets (intranets) or both, and incorporate protocols, such as Internet Protocol (IP), Transmission Control Protocol (TCP), User Datagram Protocol (UDP). The EDs 110 may be multimode devices capable of operation according to multiple radio access technologies, and incorporate multiple transceivers necessary to support such.

FIGS. 2A and 2B illustrate example apparatuses that may implement the methods and teachings according to this disclosure. FIG. 2A illustrates an example BS 170, and FIG. 2B illustrates an example ED 110. These components could be used in the wireless system 100 or in any other suitable system.

As shown in FIG. 2A, the BS 170 includes at least one processing unit 201. The processing unit 201 implements various processing operations of the BS 170. For example, the processing unit 201 could perform signal coding, data processing, power control, input/output processing, or any other functionality of the BS 170. The processing unit 201 may also be configured to implement some or all of the functionality and/or embodiments described in more detail herein. Each processing unit 201 includes any suitable processing or computing device configured to perform one or more operations. Each processing unit 201 could, for example, include a microprocessor, microcontroller, digital signal processor, field programmable gate array, or application specific integrated circuit.

The BS 170 also includes at least one communication interface 202 for wired and/or wireless communications. Each communication interface 202 includes any suitable structure for generating signals for wireless or wired transmission and/or processing signals received wirelessly or by wire. The BS 170 in this example includes at least one antenna 204 (in other examples, the antenna 204 may be omitted). Each antenna 204 includes any suitable structure for transmitting and/or receiving wireless or wired signals. One or multiple communication interfaces 202 could be used in the BS 170. One or multiple antennas 204 could be used in the BS 170. In some examples, one or more antennas 204 may be an antenna array 204, which may be used to perform beamforming and beam steering operations. Although shown as a single functional unit, a BS 170 could also be implemented using at least one transmitter interface and at least one separate receiver interface.

The BS 170 further includes one or more input/output devices 206 or input/output interfaces (such as a wired interface to the internet 150). The input/output device(s) 206 permit interaction with a user or other devices in the network. Each input/output device 206 includes any suitable structure for providing information to or receiving information from a user, such as a speaker, microphone, keypad, keyboard, display, or touchscreen, including network interface communications.

In addition, the BS 170 includes at least one memory 208. The memory 208 stores instructions and data used, generated, or collected by the BS 170. For example, the memory 208 could store software instructions or modules configured to implement some or all of the functionality and/or embodiments described herein and that are executed by the processing unit(s) 201. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the ED 110 includes at least one processing unit 250, at least one transmitter 252, at least one receiver 254, one or more antennas 256, at least one memory 258, and one or more input/output devices or interfaces 266. The processing unit 250 implements various processing operations of the ED 110, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission. Each receiver 254 includes any suitable structure for processing signals received wirelessly or by wire. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an antenna array, which may be used for beamforming and beam steering operations. Each memory 258 includes any suitable volatile and/or non-volatile storage and retrieval device(s) such as those described above with respect to FIG. 2A. The memory 258 stores instructions and data used, generated, or collected by the ED 110. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications.

It is contemplated that the communication system 100 as illustrated in FIG. 1 may support a New Radio (NR) cell, which also may be referred to as hyper cell. Each NR cell includes one or more BSs 170 using the same NR cell ID. The NR cell ID is a logical assignment to all physical BSs 170 of the NR cell and may be carried in a broadcast synchronization signal. The NR cell may be dynamically configured. The boundary of the NR cell may be flexible and the system dynamically adds or removes BSs 170 to or from the NR cell. Any number of NR cells may be implemented in the communication system 100.

For example, FIG. 3 illustrates two neighboring NR cells in an example communication system, in which the examples described in this disclosure may be implemented. It should be noted that, although referred to as NR cells (or more simply cells), a cell may be understood to mean an NG-RAN node (e.g., gNB or eNB that is connected with the NG network) in some examples. Accordingly, any reference to a cell in the present disclosure should also be understood to include reference to an NG-RAN node. FIG. 3 shows two neighboring NR cells 382, 384, however it should be understood that there may be more than two NR cells, and there may be NR cells that are not direct neighbors of each other. In the example shown, each NR cell 382, 384 includes multiple BSs 170. For example, the first NR cell 382 includes BSs 170a-170f, which are all assigned the same first NR cell ID identifying the first NR cell 382. Similarly, the second NR cell 384 includes BSs 170g-170l, which are all assigned the same second NR cell ID identifying the second NR cell 384. In this example, the first NR cell 382 is the serving cell for the ED 110. Specifically, two BSs 170a, 170b are shown to be communicating with the ED 110. It should be understood that other BSs 170 in the first NR cell 382 may communicate with the ED 110. In this example, the second NR cell 384 is a non-serving cell (or neighboring cell) with respect to the ED 110.

One BS 170*m* may be shared between the two NR cells 382, 384. For example, the BS 170*m* is assigned to one of the two NR cells 382, 384 at different times, frequencies or spatial directions. The system (e.g., at the core network) may assign the BS 170*m* to one of the two NR cells 382, 384 by switching the assigned NR cell ID for the BS 170*m* between the NR cell IDs associated with the respective NR cells 382 and 384. In some examples, the shared BS 170*m* can help to reduce interference for any EDs located at the boundary between the two NR cells 382, 384. EDs that are located near the boundaries of the two NR cells 382, 384 may experience less handovers because the shared BS 170*m* is associated with either NR cell 382, 384 at different times, frequencies or spatial directions. Further, as an ED moves between the NR cells 382, 384, the transition is a smoother experience for the user. For example, the network may change the NR cell ID assigned to the shared BS 170*m* to transition a ED moving between NR cells 382, 384. There may be any number (including zero) of shared BSs in the system.

The NR cell topology may be updated by the system (e.g., at the core network), for example adapt to changes in network topology, load distribution, and/or ED distribution. For example, if the concentration of EDs increases in one region, the system may dynamically expand the NR cell to include BSs near the higher concentration of EDs. For example, the system may expand the NR cell to include other BSs if the concentration of EDs located at the edge of the NR cell increases above a certain threshold. As another example, the system may expand a NR cell to include a greater concentration of EDs located between two NR cells. In some examples, if the traffic load increases significantly at one region, the system may also expand the NR cell associated with the region to include BSs for the increased traffic load. For example, if the traffic load of a portion of the network exceeds a predetermined threshold, the system may change the assigned NR cell ID of one or more BSs that are transmitting to the impacted portion of the network.

In some examples, the system can change the association of a BS with different NR cells periodically, such as every 1 millisecond. Such a flexible NR cell formation mechanism may enable EDs to be better served by BSs and may help to reduce or eliminate the number of cell edge EDs.

The system may apply BS selection techniques to minimize intra-NR cell interference and inter-NR cell interference. In an example, a BS sends a downlink CSI-RS. Some pilot (also known as reference signal) ports may be defined such that the ED can measure the channel state information and report it back to the network. A CSI-RS port is a pilot port defined as a set of known symbols from a sequence transmitted over known resource elements (for example OFDM resource elements) for the ED to measure the channel state. An ED assigned to measure a particular CSI-RS port can measure the transmitted CSI-RS sequence, measure the associated channel state and report it back to the network. The network, such as a controller, may select the best BS(s) for all served EDs based on the downlink measurements. In another example, a BS detects an uplink SRS sequence from a ED in the configured time-frequency resources. For example, Constant Amplitude Zero Auto Correlation (CAZAC) sequences such as Zadoff-Chu (ZC) sequences can be used as base sequences for SRS. The BS reports a measurement of the detected uplink SRS sequence to the network, such as a controller. The network controller then selects the optimal BS(s) for all served ED based on the measurements.

Figure 4:
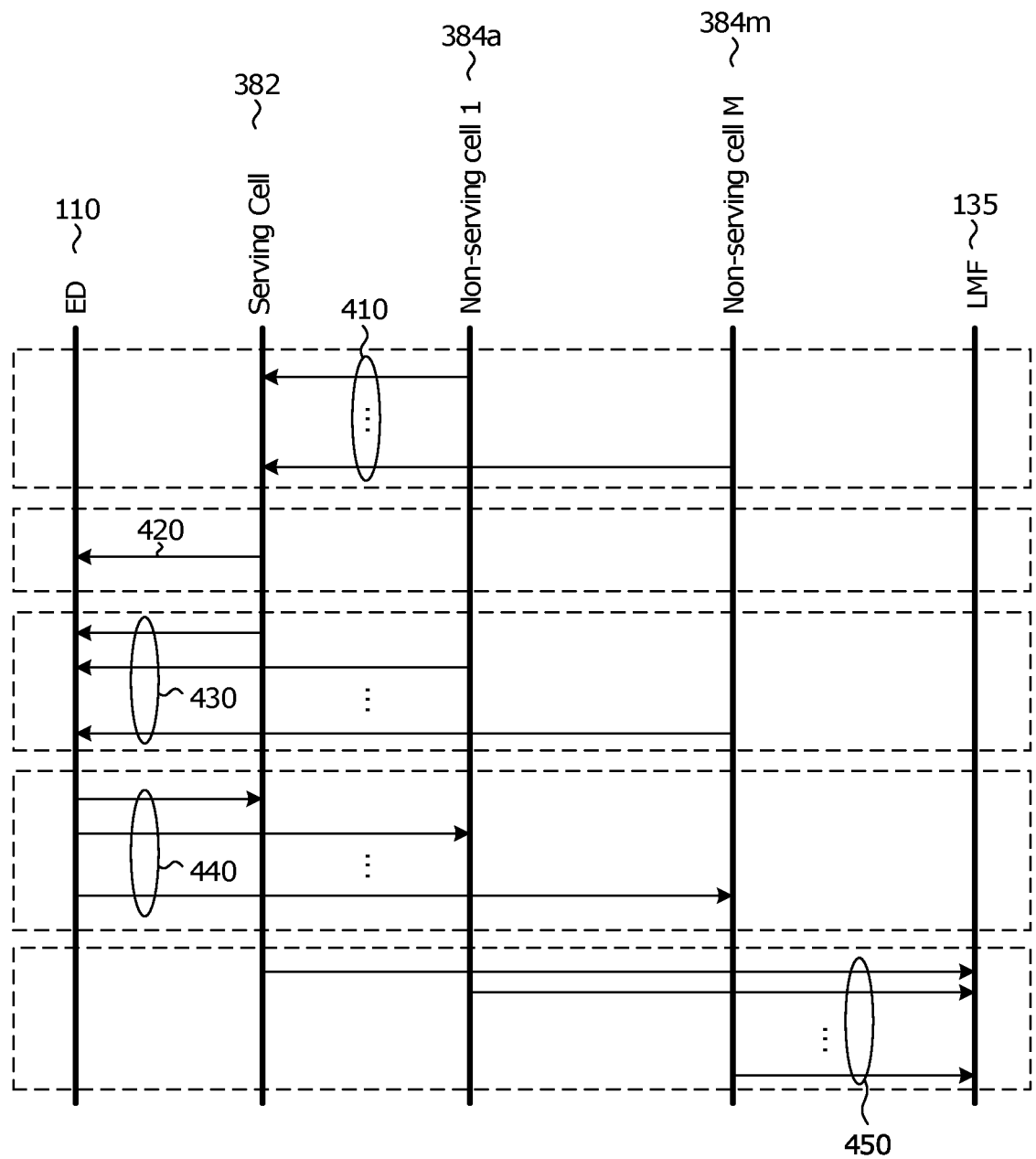
FIG. 4 is an example dataflow illustrating an example of sounding reference signal (SRS) measurement, in accordance with examples described herein.

FIG. 4 illustrates an example signal flow diagram that illustrates an example SRS measurement, in accordance with examples described herein.

FIG. 4 shows signaling performed by the ED 110, a BS in a serving cell 382 (only one serving cell is shown in this figure, but it should be understood that multiple serving cells may be involved in the process), BSs in M non-serving cells (only non-serving cell 1 384*a* and non-serving cell M 384*m* are shown; generally referred to as non-serving cell 384), and the LMF 135. For simplicity, the present disclosure refers to signals being transmitted to or from a serving cell or a non-serving cell; however, it should be understood that signaling to and from a cell is handled by one or more BSs of that cell.

in a step 410, the serving cell 382 may configure a TF RS per SRS resource or a PL RS per SRS resource set, or both. Note that each SRS resource set is comprised of at least one SRS resource. Also, at least one of the M non-serving cells 384 may configure a TF RS per SRS resource or a PL RS per SRS resource set, or both, either without any coordination with the serving cell or in coordination with the serving cell. In some examples, a non-serving cell 384 may send SRS resource set configurations that include the configurations of the TF RSs and/or PL RSs to the serving cell 382, which is in communication with the ED 110, using a backhaul channel between the serving cell 382 and the non-serving cell 384.

In a step 420, the serving cell 382 sends the configurations of the SRS resource sets for the serving cell 382 and any configurations of the SRS resource sets received from the non-serving cells 384 to the ED 110. Note that, in some examples, the configurations of the PL RS and/or TF RS may alternatively be sent to the ED no from the LMF 135. This procedure is not shown in FIG. 4. Some examples where the LMF 135 sends the PL RS and/or TF RS configurations to the ED 110 will be discussed later in this disclosure.

In a step 430, the serving cell 382 and the non-serving cells 384 transmit the configured TF RS or PL RS, or both, to the ED 110. The BSs in the serving cell 382 and/or the non-serving cells 384 may send the TF RS in multiple beam directions. Because the ED 110 has received the TF RS or PL RS configuration beforehand (in step 420), the ED 110 is able to detect at least one of the DL PL RS and DL TF RS beam(s) that is(are) transmitted from the serving cell 382 and/or the non-serving cells 384. To detect each DL TF RS or DL PL RS, or both, the ED 110 typically uses spatial domain receive beam sweeping and determines which spatial domain receive beam is best to receive the DL TF RS from a serving cell 382 or non-serving cell 384. The ED 110 then uses the same "best" spatial domain receive beam as the spatial domain transmission beam for transmission of the SRS that is intended to be received at the respective serving cell 402 or non-serving cell 384. The ED 110 may use UL/DL channel reciprocity in determining the spatial domain transmission filter.

In a step 440, the ED 110 uses the received TF RSs to obtain the spatial transmission filter of the corresponding SRS resource sets and/or the PL RSs to determine the transmit power of the corresponding SRS resource sets and transmits the SRS resource sets using the obtained transmission filters and transmit powers.

In a step 450, the BSs of the serving cell 382 and the non-serving cells 384 may send the measurements that are obtained from the received SRSs back to the LMF 135 to process. For example, the LMF 135 may use the received information to determine the position of the ED 110.

Each of the respective steps may take place within a respective time frame, which are periods of time that are allotted within the communication network allowing the indicated signals to be transmitted and received. The signals described for a respective step (which may take place in a respective time frame) may be transmitted simultaneously, or sequentially, for the serving cell and the various non-serving cells.

In one example, the present disclosure describes some example configuration details of a PL PRS or TF PRS. The PL PRS or TF PRS configuration information in these examples are transmitted to the ED by the serving cell or the LMF.

In examples described herein, the PRS may be configured to be used as a TF RS or a PL RS transmitted from a non-serving cell or the serving cell to the ED. The PL PRS configuration or TF PRS configuration provides information to the ED to enable the ED to properly receive a PL PRS or TF PRS from a non-serving cell or a serving cell. Conventionally, PRS has not been used for the purpose of determining PL and/or TF.

The PL PRS configuration or TF PRS configuration may be sent to the ED by serving cell (e.g., using RRC signaling) or by the LMF (e.g., using LTE positioning protocol (LPP)), for example. For example, the serving cell or the LMF may receive configuration information from the non-serving cell (e.g., the non-serving cell may communicate configuration information to the serving cell using Xn Application Protocol (XnAP) or F1 Application Protocol (F1AP); or the non-serving cell may communicate configuration information to the LMF using New Radio Positioning Protocol A (NRPPa); or the non-serving cell may communicate configuration information to the LMF using NRPPa and then the LMF may in turn communicate the configuration information to the serving cell using NRPPa). Generally, it should be understood that in communications between the LMF and a cell (serving or non-serving cell) using NRPPa, the term "cell" may be more specifically understood to mean a NG-RAN node (e.g., a gNB or NG-eNB). Some details of how configuration information may be communicated by the non-serving cell are further described in examples 5 below.

In the transmitted PL PRS or TF PRS configuration, at least the PRS ID (or PRS configuration index) is included. The PRS ID may be used to identify the PRS transmitted from the non-serving cell or serving cell as being used for determining PL or TF. For example, the ED may be configured to recognize PRS ID #7 as being a PRS for PL purposes. It may be noted that, conventionally, PRS ID has not been communicated using RRC signaling. Also, in Rel. 15 NR, PL PRS and TF PRS are not supported.

In some examples, one of more of the following fields are also included in the PL PRS or TF PRS configuration information. The configuration information may include a field indicating the physical cell ID (PCID) of the cell (e.g., non-serving cell) that will send the PL PRS or TF PRS. The configuration information may include a field indicating the configuration of a SSB, CSI-RS or PRS that is quasi colocation-Type D (QCL-D) with the PL PRS or TF PRS (discussed further below). Two signals that are QCL-D (as defined according to 3GPP standard) means that the two signals share common spatial receiver parameters. The configuration information may include a field indicating a New Radio Absolute Radio-Frequency Channel Number (NR ARFCN) value to determine the PL PRS or TF PRS location in the frequency domain. The configuration information may include field(s) indicating the bandwidth, slot offset, frame offset and/or symbol offset of the PL PRS or TF PRS. The configuration information may include a field indicating the number of antenna ports of the PL PRS or TF PRS. The configuration information may include a field indicating the number of DL frame that the PL PRS or TF PRS is to be transmitted at. The configuration information may include field(s) indicating the PL PRS or TF PRS muting configuration and/or hopping configuration. The configuration information may include a field indicating the number of available narrowband for PL PRS or TF PRS. The configuration information may also include field(s) indicating a periodicity and offset for the PL PRS or TF PRS. The configuration information may also include field(s) indicating a scrambling ID and offset for the PL PRS or TF PRS.

As mentioned above, the PL PRS or TF PRS configuration information may include a field indicating the configuration of the SSB, CSI-RS or PRS that is QCL-D with the PL PRS or TF PRS. It is necessary for the ED to be informed that the PL PRS or TF PRS is being transmitted using a particular transmission beamformer, to enable the ED to properly detect the PL PRS or TF PRS. A SSB, CSI-RS or PRS (which is already configured for the ED) that is QCL-D with the PL PRS or TF PRS can be used as a substitute for locating the PL PRS or TF PRS. The ED may use the same receive beamformer configuration, which is already known for the SSB, CSI-RS or PRS, to detect the PL PRS or TF PRS. In other words, the configuration of the SSB, CSI-RS or PRS that is QCL-D with the PL PRS or TF PRS can be indicated to the ED, to enable the ED to use that configuration to detect the PL PRS or TF PRS.

The configuration of the SSB, CSI-RS or PRS that is QCL-D with the PL PRS or TF PRS may be indicated using at least the SSB index, CSI-RS index or PRS index, respectively. The configuration of the SSB, CSI-RS or PRS may include one or more of the following fields. For example, the configuration may include a field indicating the PCID of the cell associated with the QCL-D SSB, CSI-RS or PRS; may include a field indicating a NR ARFCN value to determine the QCL-D SSB, CSI-RS or PRS location in the frequency domain; and/or may include a field indicating time domain reference(s) to determine the QCL-D SSB, CSI-RS or PRS location in the time domain.

The example described above provide configuration details that enable the ED to detect a PRS originating outside of the serving cell, for the purpose of determining PL and/or TF, in order to enable transmission of SRS to a non-serving cell.

Figure 5:
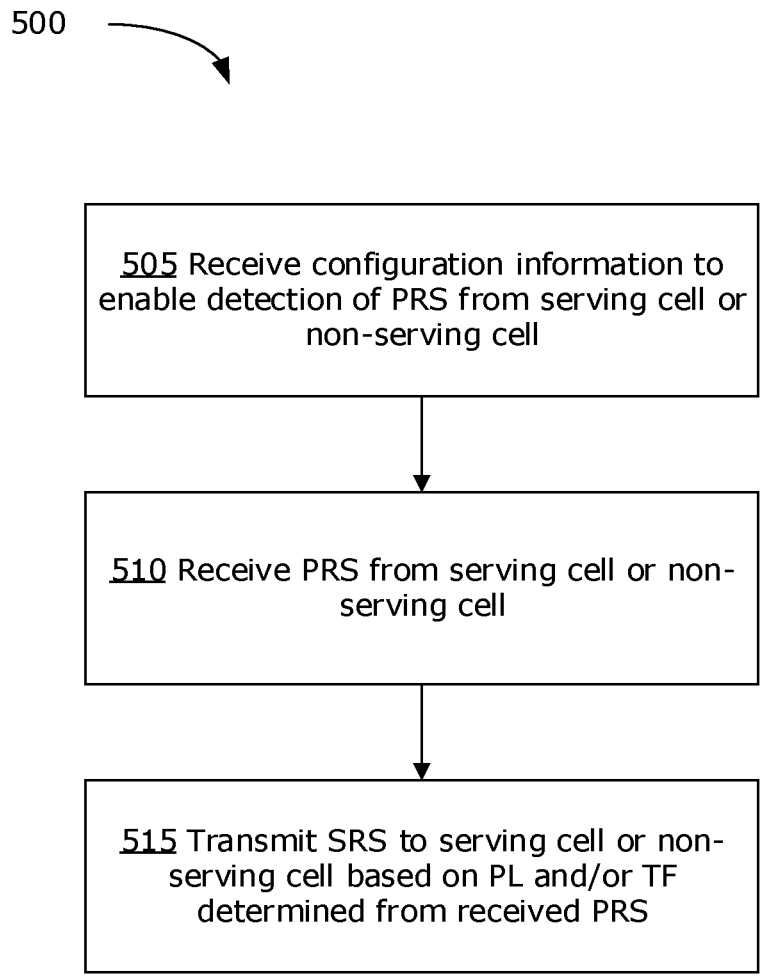
FIG. 5 is a flowchart illustrating an example method for configuration of a downlink (DL) reference signal (RS) and transmission of a SRS to a non-serving cell.

FIG. 5 is a flowchart illustrating an example method 500 that may be performed in accordance with the example described above. The method 500 may be implemented in the ED (e.g., using a processing unit of the ED executing instructions stored in a memory of the ED).

At 505, the ED receives configuration information for the PL PRS or TF PRS from the serving cell or the LMF. The configuration information may include the fields described above, for example.

At 510, using the configuration information the ED is enabled to receive the PL PRS or TF PRS from the serving cell or the non-serving cell. In examples in which the configuration information includes information about another configured reference signal (e.g., another configured SSB, CSI-RS or PRS) that is QCL-D with the PRS, the ED is enabled to receive the PL PRS or TF PRS based on the configuration for the configured reference signal.

At 515, the ED transmits a SRS to the serving cell or the non-serving cell, based on PL and/or TF determined from the received PL PRS or TF PRS.

In another example, the present disclosure describes some example configuration details of a PL SSB, TF SSB, PL CSI-RS, or TF CSI-RS. Configurations of the PL SSB, TF SSB, PL CSI-RS, or TF CSI-RS in these examples are transmitted to the ED by the serving cell or the LMF.

In examples described herein, a SSB or CSI-RS may be configured to be used as a TF RS or a PL RS transmitted from the non-serving cell to the ED. The PL SSB, TF SSB, PL CSI-RS, or TF CSI-RS configuration provides information to the ED to enable the ED to properly receive a PL SSB, TF SSB, PL CSI-RS, or TF CSI-RS from a non-serving cell. The ED may then use the received PL SSB, TF SSB, PL CSI-RS, or TF CSI-RS to determine PL and/or TF for transmission of a SRS to the non-serving cell.

The configuration information may be sent to the ED by the serving cell or by the LMF using any suitable method (e.g., RRC signaling from the serving cell, or via LPP from the LMF). For example, the serving cell or the LMF may receive configuration information from the non-serving cell (e.g., the non-serving cell may communicate configuration information to the serving cell using Xn Application Protocol (XnAP) or F1AP; or the non-serving cell may communicate configuration information to the LMF using New Radio Positioning Protocol A (NRPPa); or the non-serving cell may communicate configuration information to the LMF using NRPPa and then the LMF may in turn communicate configuration information to the serving cell using NRPPa). As explained above, it should be understood that in communications between the LMF and a cell (serving or non-serving cell) using NRPPa, the term "cell" may be more specifically understood to mean a NG-RAN node (e.g., a gNB or NG-eNB). Some details of how configuration information may be communicated by the non-serving cell are further described in examples below.

Configuration information for the PL SSB or TF SSB is described first.

In some examples, the configuration PL SSB or TF SSB may include the SSB ID and the PCID of the cell (e.g., non-serving cell) transmitting the PL SSB or TF SSB. In some examples, the configuration PL SSB or TF SSB may further include the configuration of a PRS, SSB or CSI-RS that is QCL-D with the PL SSB or TF SSB. As previously explained, a PRS, SSB or CSI-RS that is QCL-D with the PL SSB or TF SSB may be used as a substitute for locating the PL SSB or TF SSB. The configuration of the RS (e.g., PRS, SSB or CSI-RS) that is QCL-D with the PL SSB or TF SSB may include at least the index of that QCL-D RS. In some examples, the configuration of the QCL-D RS may further include one or more of the following fields. The configuration of the QCL-D RS may include a field indicating the PCID of the cell associated with the QCL-D RS; a field indicating a NR ARFCN value to determine the QCL-D RS location in the frequency domain; and/or a field indicating time domain reference(s) to determine the QCL-D RS location in the time domain.

For example, it may be possible to configure the spatial relation information (spatialRelationInfo) RS from the set of DL RSs that are already detected by the ED and/or configured to the ED for potentially other purposes. This includes the detected SSBs from the serving or non-serving cells during, for instance, the initial access, configured CSI-RS resource from the serving cell, configured SSBs or CSI-RS resources in measurement object NR (MeasObjectNR) from the serving or non-serving cells, or configured DL PRS resources for the reference signal time difference (RSTD) or the ED "receiver-transmitter" time difference measurements. In general, and considering that the spatialRelationInfo RS can be received by the ED from a non-serving cell, the spatialRelationInfo RS configuration may indicate all parameters that enable the ED to detect a DL RS. Depending on the DL RS type (e.g., SSB, CSI-RS, or DL PRS), this information may include reference time and frequency points, time and frequency domain resource mapping parameters, periodicity and offset, PCID, resource ID, scrambling ID, and possibly QCL-D properties.

To uniquely identify the spatialRelationInfo RS, it may be sufficient to indicate to the ED the DL RS resource ID and the PCID of the corresponding serving or neighboring cell. For example, when the spatialRelationInfo SSB (used as a TF SBB) or pathlossReference SSB (used as a PL SSB) are already configured for other purposes, the SSB may be indicated in RRC using SSB index and the PCID of the serving or non-serving cell transmitting the SSB. The spatialRelationInfo RS may be configured in RRC and the spatialRelationInfo RS configuration may include the resource ID of the DL RS (e.g., SSB, CSI-RS, or DL-PRS) and the cell ID of the transmitting serving or non-serving cell.

In some examples, LMF may send the configurations of the DL PRS resource of the serving and/or non-serving cell to the ED using LPP. The serving cell may be transparent to the DL PRS configurations of the non-serving cells. If the DL PRS that is used as a spatialRelationInfo RS is already configured to the ED by the LMF (e.g., for enabling the RSTD or the ED's "receiver-transmitter" time difference measurements), the serving cell may need to indicate the DL PRS resource ID and the PCID of the corresponding cell to configure the DL PRS as the spatialRelationInfo RS in the SRS-Config information element (IE) in RRC. The DL PRS resource ID and the PCID of the non-serving cell can be provided by the LMF to the serving cell using, for example, NRPPa (particularly in the case where the serving cell is a NG-RAN node).

Configuration information for the PL CSI-RS or TF CSI-RS is now described.

In some examples, the configuration PL CSI-RS or TF CSI-RS may include only the CSI-RS ID and the PCID of the cell (e.g., non-serving cell) transmitting the PL CSI-RS or TF CSI-RS. In some examples, the configuration PL CSI-RS or TF CSI-RS may further include the configuration of a PRS, SSB or CSI-RS that is QCL-D with the PL CSI-RS or TF CSI-RS. As previously explained, a PRS, SSB or CSI-RS that is QCL-D with the PL SSB or TF SSB may be used as a substitute for locating the PL CSI-RS or TF CSI-RS. The configuration of the RS (e.g., PRS, SSB or CSI-RS) that is QCL-D with the PL CSI-RS or TF CSI-RS may include at least the index of that QCL-D RS. In some examples, the configuration of the QCL-D RS may further include one or more of the following fields. The configuration of the QCL-D RS may include a field indicating the PCID of the cell associated with the QCL-D RS; a field indicating a NR ARFCN value to determine the QCL-D RS location in the frequency domain; and/or a field indicating time domain reference(s) to determine the QCL-D RS location in the time domain.

Similar to the above discussion in the context of spatialRelationInfo RS, it may be possible to configure the pathlossReferenceRS from the set of DL RSs that are already detected by the ED and/or configured to the ED for potentially other purposes. The pathlossReferenceRS, transmitted from the serving or non-serving cell, may be indicated to the ED pathlossReferenceRS in RRC, for example. The indication in RRC may include the resource ID of the DL RS (SSB or CSI-RS) and the PCID of the transmitting serving or non-serving cell, to enable the ED to uniquely identify the pathlossReferenceRS.

As discussed above, in some examples it is possible to configure the ED to detect a DL RS for the purpose of PL or TF, where the full configuration information of the DL RS was previously provided to the ED for another purpose. The previously provided full configuration information may include, for example in the case where the DL RS is a PRS, the resource ID of the PRS, the cell ID of the transmitting serving or non-serving sell, a field indicating the configuration of another reference signal (e.g., SSB or PRS) that is QCL-D with the PRS, a field indicating the NR ARFCN value to determine the location of the PRS in the frequency domain, bandwidth, slot offset, frame offset, symbol offset, muting configuration, periodicity and offset, and scrambling ID. In examples where the DL RS is a SSB, full configuration information may be a set of parameters providing sufficient information to locate the SSB in the time-frequency domain, the SSB index, and the associated cell ID of the transmitting serving or non-serving cell.

The example described above may be relatively simple to implement in the context of current methodologies. For example, if a DL RS (e.g., SSB or CSI-RS) has already been configured to the ED for other purposes and/or has already been detected by the ED, only a small number of fields (e.g., as few as two fields to indicate the ID of the SSB or CSI-RS, and to indicate the PCID of the originating cell) need to be indicated to the ED to enable the ED to recognize which of the already configured or detected DL RSs should be used as a PL SSB, TF SSB, PL CSI-RS, or TF CSI-RS.

Figure 6:
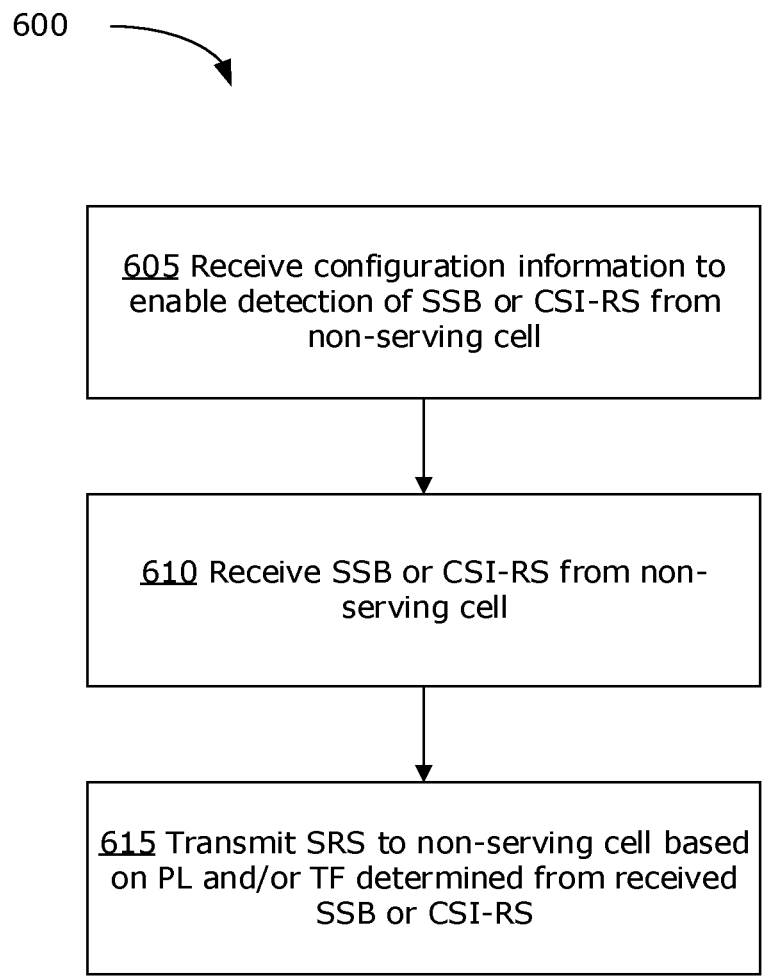
FIG. 6 is a flowchart illustrating another example method for configuration of a DL RS and transmission of a SRS to a non-serving cell.

FIG. 6 is a flowchart illustrating an example method 600 that may be performed in accordance with the example described above. The method 600 may be implemented in the ED (e.g., using a processing unit of the ED executing instructions stored in a memory of the ED).

At 605, the ED receives configuration information for the PL SSB, TF SSB, PL CSI-RS, or TF CSI-RS from the serving cell or the LMF. The configuration information may include the fields described above (e.g., including the SSB ID or CSI-RS ID, and the PCID), for example.

At 610, using the configuration information the ED is enabled to receive the PL SSB, TF SSB, PL CSI-RS, or TF CSI-RS from the non-serving cell. In examples in which the configuration information includes information about another configured reference signal (e.g., another configured SSB, CSI-RS or PRS) that is QCL-D with the PL SSB, TF SSB, PL CSI-RS, or TF CSI-RS, the ED is enabled to receive the PL SSB, TF SSB, PL CSI-RS, or TF CSI-RS based on the configuration for the configured reference signal.

At 615, the ED transmits a SRS to the non-serving cell, based on PL and/or TF determined from the received PL SSB, TF SSB, PL CSI-RS, or TF CSI-RS.

In another example, the present disclosure describes example fallback procedures that may be used by the ED in the event that the PL CSI-RS, TF CSI-RS, PL PRS or TF PRS is not obtained/detected by the ED, or the PL CSI-RS, TF CSI-RS, PL PRS or TF PRS is not configured to the ED. After the ED has received configuration information for the PL CSI-RS, TF CSI-RS, PL PRS or TF PRS (e.g., as described above), the ED may expect to receive the respective PL CSI-RS, TF CSI-RS, PL PRS or TF PRS, for determining PL or TF of a SRS that is to be transmitted to a non-serving cell or a serving cell. However, the ED may fail to obtain or detect the expected PL CSI-RS, TF CSI-RS, PL PRS or TF PRS (e.g., due to changing channel conditions, ED receiver circuit failure, unexpected interference, or other reasons). In such a case, and also in the case that PL CSI-RS, TF CSI-RS, PL PRS or TF PRS is not configured to the ED, it would be desirable to provide a fallback procedure, to enable the ED to proceed with transmission of the SRS to the non-serving cell, even in the absence of a detected PL CSI-RS, TF CSI-RS, PL PRS or TF PRS or in the absence of a configured PL CSI-RS, TF CSI-RS, PL PRS or TF PRS.

In some examples, the ED may determine that the fallback procedure should be used after the expected PL CSI-RS, TF CSI-RS, PL PRS or TF PRS has not been received in the configured time and frequency location or PL CSI-RS, TF CSI-RS, PL PRS or TF PRS is not configured to ED.

In some examples, if PL PRS or TF PRS has been configured but the fallback procedure has been triggered (e.g., the PL PRS or TF PRS has not been detected by the ED within the expected time or timeframe) or PL PRS or TF PRS is not configured to ED, then the ED may use a detected SSB or a detected CSI-RS as a substitute PL RS or TF RS.

In some examples, the ED may use a detected SSB originating from the cell (e.g., the non-serving cell) that was configured (e.g., indicated by the PCID included in the configuration information, as discussed above) for the expected PL PRS or TF PRS as a substitute PL RS or TF RS, respectively. In the event that the ED detects more than one SSB originating from the configured cell, the ED may select one of the multiple SSBs as a substitute PL RS or TF RS based on any suitable criterion. For example, the ED may select the SSB with the highest reference signal received power (RSRP) as a substitute PL RS or TF RS. In some examples, in the event that the ED detects more than one SSB originating from the configured cell, the ED may use any suitable technique to calculate PL based on the received power from the detected SSBs originating from the configured cell, or the ED may use any suitable selection criterion to determine which of the detected SSBs should be used as a substitute TF RS.

In some examples, the ED may use any of the methods described in the above paragraph when the SRS is configured to be received at a non-serving cell (e.g., PCID included in the configuration information is a PCID of a non-serving cell) and the ED may use the SSB that was used to obtain system information (e.g., MIB and/or System Information Block Type 1 (SIB1)) as a substitute PL RS or TF RS when the SRS is configured to be received at a serving cell (e.g., PCID included in the configuration information is a PCID of the serving cell).

In some examples, the ED may use a detected CSI-RS originating from the cell (e.g., the non-serving cell) that was configured (e.g., indicated by the PCID included in the configuration information, as discussed above) for the expected PL PRS or TF PRS as a substitute PL RS or TF RS, respectively. In the event that the ED detects more than one CSI-RS originating from the configured cell, the ED may select one of the multiple CSI-RSs as a substitute PL RS or TF RS based on any suitable criterion. For example, the ED may select the CSI-RS with the highest RSRP as a substitute PL RS or TF RS. In some examples, in the event that the ED detects more than one CSI-RS originating from the configured cell, the ED may use any suitable technique to calculate PL based on the received power from the detected CSI-RSs originating from the configured cell, or the ED may use any suitable selection criterion to determine which of the detected CSI-RSs should be used as a substitute TF RS.

In some examples, if a PL CSI-RS or TF CSI-RS has been configured but the fallback procedure has been triggered (e.g., the PL CSI-RS or TF CSI-RS has not been detected by the ED within the expected time or timeframe) or a PL CSI-RS or TF CSI-RS has not been configured, then the ED may use a detected SSB or a detected PRS as a substitute PL RS or TF RS.

In some examples, the ED may use a detected SSB originating from the cell (e.g., the non-serving cell) that was configured (e.g., indicated by the PCID included in the configuration information, as discussed above) for the expected PL CSI-RS or TF CSI-RS as a substitute PL RS or TF RS, respectively. In the event that the ED detects more than one SSB originating from the configured cell, the ED may select one of the multiple SSBs as a substitute PL RS or TF RS based on any suitable criterion. For example, the ED may select the SSB with the highest reference signal received power (RSRP) as a substitute PL RS or TF RS. In some examples, in the event that the ED detects more than one SSB originating from the configured cell, the ED may use any suitable technique to calculate PL based on the received power from the detected SSBs originating from the configured cell, or the ED may use any suitable selection criterion to determine which of the detected SSBs should be used as a substitute TF RS.

In some examples, the ED may use any of the methods described in the above paragraph when the SRS is configured to be received at a non-serving cell (e.g., PCID included in the configuration information is a PCID of a non-serving cell) and the ED may use the SSB that was used to obtain system information (e.g., MIB and/or System Information Block Type 1 (SIB1)) as a substitute PL RS or TF RS when the SRS is configured to be received at a serving cell (e.g., PCID included in the configuration information is a PCID of the serving cell).

In some examples, the ED may use a detected PRS originating from the cell (e.g., the non-serving cell) that was configured (e.g., indicated by the PCID included in the configuration information, as discussed above) for the expected PL CSI-RS or TF CSI-RS as a substitute PL RS or TF RS, respectively. In the event that the ED detects more than one PRS originating from the configured cell, the ED may select one of the multiple PRSs as a substitute PL RS or TF RS based on any suitable criterion. For example, the ED may select the PRS with the highest RSRP as a substitute PL RS or TF RS. In some examples, in the event that the ED detects more than one PRS originating from the configured cell, the ED may use any suitable technique to calculate PL based on the received power from the detected PRSs originating from the configured cell, or the ED may use any suitable selection criterion to determine which of the detected PRSs should be used as a substitute TF RS.

In some examples, in the event the ED does not detect the expected PL PRS, TF PRS, PL CSI-RS or TF CSI-RS or PL PRS, TF PRS, PL CSI-RS or TF CSI-RS is not configured for the ED, the ED may use the SSB that was used to obtain system information (e.g., MIB and/or System Information Block Type 1 (SIB1)) as a substitute PL RS or TF RS. In other examples, the ED may use, as a substitute, the PL SSB of the SRS Resource set that is configured for the serving cell (e.g., the PL SSB of the SRS resource set whose configuration includes the PCID of the serving cell t) as the PL RS of the SRS Resource set for the SRS transmission to the non-serving cell.

In some examples, in the event the ED does not detect the expected PL PRS, TF PRS, PL CSI-RS or TF CSI-RS or PL PRS, TF PRS, PL CSI-RS or TF CSI-RS is not configured for the ED, the ED may use any suitable technique to calculate PL. In some examples, in the event the ED does not detect the expected PL PRS, TF PRS, PL CSI-RS or TF CSI-RS, the ED may also use any suitable technique to perform beamforming for the SRS transmission to the non-serving cell. For example, the ED may simply assume that the PL or TF is the same as for the current serving cell.

In some examples, in the event the ED does not detect the expected PL PRS, TF PRS, PL CSI-RS or TF CSI-RS or PL PRS, TF PRS, PL CSI-RS or TF CSI-RS is not configured for the ED, the ED may not transmit the corresponding SRS Resource (set).

The above example address the situation in which the PL CSI-RS, TF CSI-RS, PL PRS, or TF PRS that was configured is not obtained or detected by the ED or the situation in which PL PRS, TF PRS, PL CSI-RS or TF CSI-RS is not configured for the ED. The example provide various fallback procedures that may be used by the ED as a substitute for calculation of DL pathloss and/or the SRS spatial domain filter.

Figure 7:
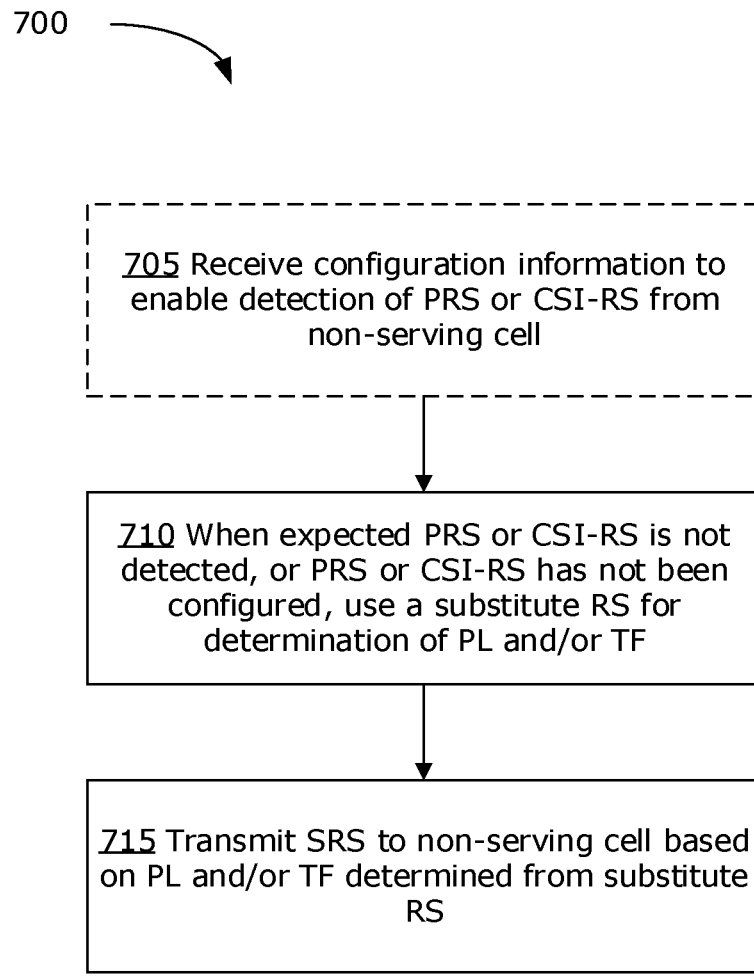
FIG. 7 is a flowchart illustrating an example method for a fallback procedure when an expected DL RS is not received.

FIG. 7 is a flowchart illustrating an example method 700 that may be performed in accordance with the example described above. The method 700 may be implemented in the ED (e.g., using a processing unit of the ED executing instructions stored in a memory of the ED).

Optionally, at 705, the ED receives configuration information for an expected PL PRS, TF PRS, PL CSI-RS, or TF CSI-RS from the serving cell or the LMF. The configuration information may include the fields described above (e.g., with respect to examples above), for example.

At 710, when the expected PL PRS, TF PRS, PL CSI-RS or TF CSI-RS is not detected (e.g., expected PL PRS, TF PRS, PL CSI-RS or TF CSI-RS has not been detected in the configured time or timeframe), or if PL PRS, TF PRS, PL CSI-RS or TF CSI-RS has not been configured for the ED, the ED uses another detected RS (e.g., as described above) as a substitute PL RS or TF RS. The ED determines PL and/or TF using the substitute PL RS or TF RS.

At 715, the ED transmits a SRS to the non-serving cell, based on PL and/or TF determined using the substitute PL RS or TF RS.

In another example, the present disclosure describes examples that enable the ED to receive the configuration of PL RS or TF RS from the LMF. The example further include examples that enable the LMF to acquire PL RS or TF RS configuration details from serving and/or non-serving cell (s). These examples enable the ED to receive configuration information that originates from a cell, but transmitted via the LMF.

In some examples, the ED may receive the configuration of PL RS (e.g., PL SSB, PL CSI-RS or PL PRS) and/or TF RS (e.g., TF SSB, TF CSI-RS or TF PRS) from the LMF, for example via LPP.

In some examples, the LMF may request configuration information of the PL RS and/or TF RS from each respective cell (e.g., each cell that transmits the PL RS and/or TF RS), for example using NRPPa (e.g., where each respective cell is a NG-RAN node). The request transmitted by the LMF may include one or more suggested values for one or more configuration fields of the PL RS and/or TF RS (e.g., may include suggested values for QCL-D information or bandwidth). The cell(s) to which the LMF transmits this request may include the serving cell and/or non-serving cell(s) of the ED. The suggested value(s) included by the LMF in the transmitted request may or may not be overridden by the respective cell.

In some examples, the respective cell(s) may, in response to the request from the LMF, send the requested configuration information of the PL RS and/or TF RS to the LMF, for example using NRPPa (e.g., where each respective cell is a NG-RAN node).

In some examples, a cell (e.g., serving cell or non-serving cell) may transmit the configuration information of the PL RS and/or TF RS to the LMF as part of the cell initiation process, in the absence of an explicit request from the LMF.

The example provides various mechanisms for communicating configuration information of the PL RS and/or TF RS between cells and the LMF. The ED may then receive the configuration information, which originated from a cell, via the LMF.

Figure 8A:
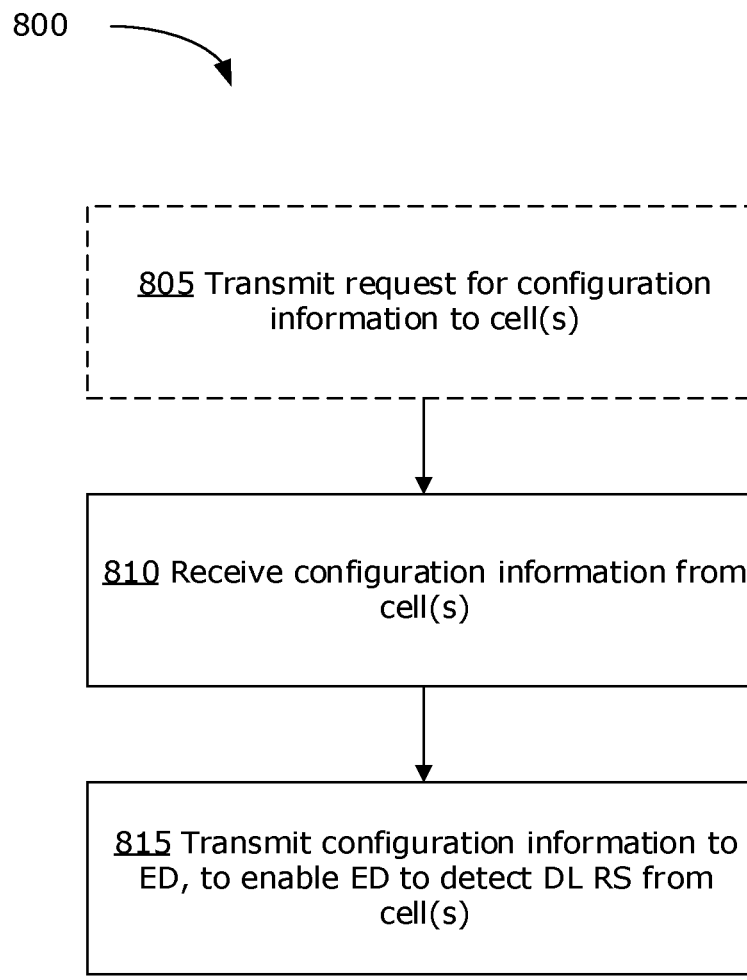
FIG. 8A is a flowchart illustrating an example method for a location management function (LMF) to provide configuration information to an ED.

FIG. 8A is a flowchart illustrating an example method 800 that may be performed in accordance with the example described above. The method 800 may be implemented in the LMF (e.g., at the network entity that implements the LMF in the core network or elsewhere in the system).

Figure 8B:
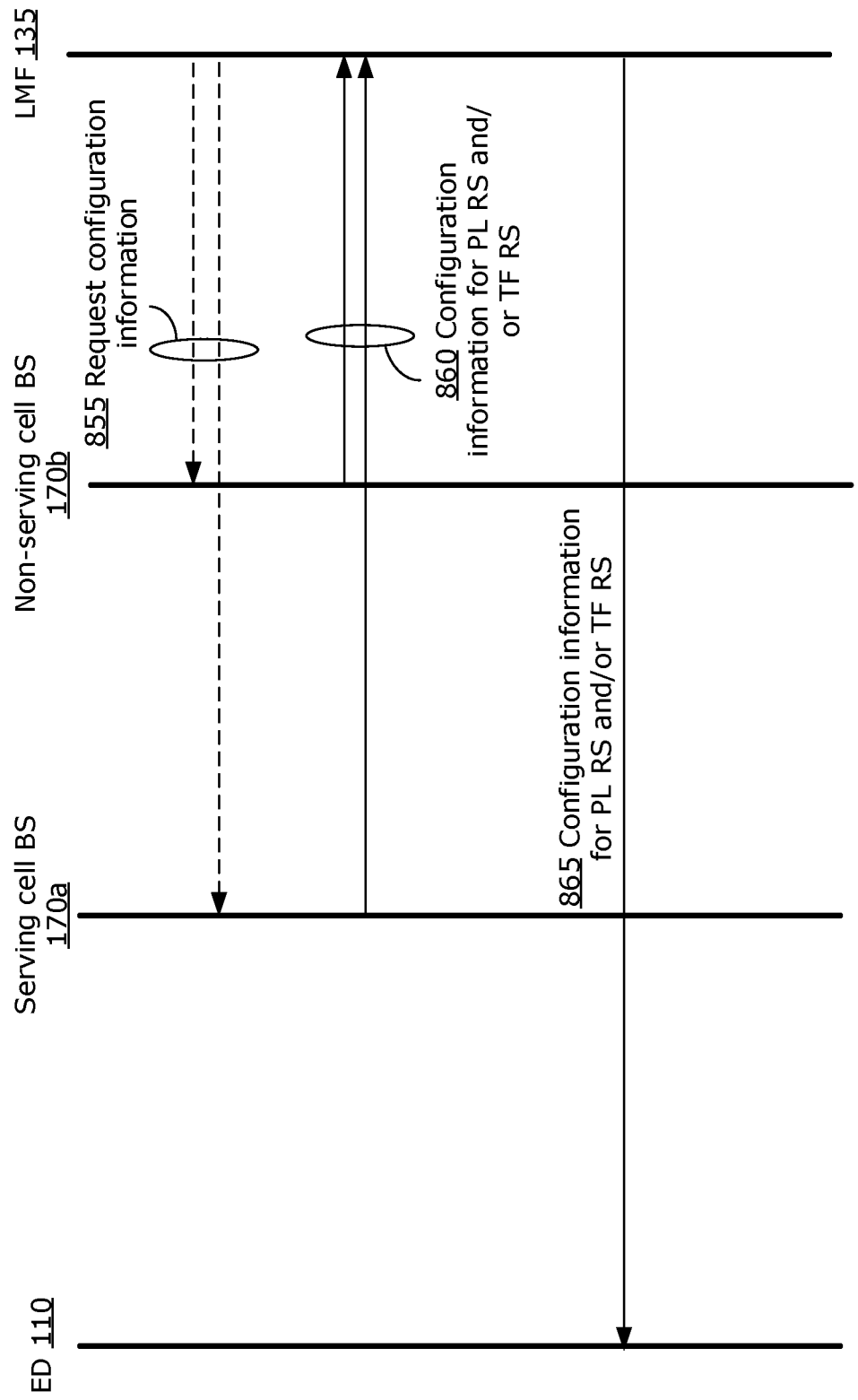
FIG. 8B is a signaling diagram illustrating example signaling for a LMF to provide configuration information to an ED.

FIG. 8B is an example signal flow diagram illustrating signaling between network entities, which may be used to implement the example described above. FIG. 8B shows signaling performed by the ED 110, a first BS 170*a* in a serving cell (also referred to as the serving cell BS 170*a*), a second BS 170*b* in a non-serving cell (also referred to as the non-serving cell BS 170*b*), and the LMF 135. For simplicity, the present disclosure may refer to signals being transmitted to or from a serving cell or a non-serving cell; however, it should be understood that signaling to and from a cell is handled by the respective BS of that cell. For simplicity, only one serving and one non-serving cell is shown. However, it should be understood that there may be more than one serving cell and/or more than one non-serving cell.

FIGS. 8A and 8B will be discussed together, for ease of understanding.

At 805, optionally, the LMF transmits a request 855 to one or more cells (e.g., serving cell BS 170*a* and/or non-serving cell BS(s) 170*b*) requesting configuration information for PL RS and/or TF RS (also referred to generally as a DL RS). The request 855 may be transmitted using NRPPa, for example where each cell is a NG-RAN node. In some examples, the cell(s) may transmit configuration information without being requested by the LMF (e.g., at cell initiation). The request may include a suggested value for a configuration field.

At 810, the LMF receives a message 860 from the BSs 170*a*, 170*b* of each respective cell, the message including configuration information for the PL RS and/or TF RS, to enable the ED to detect the DL RS from the respective cell. The message 860 may be transmitted using NRPPa, for example where each respective cell is a NG-RAN node.

At 815, the LMF transmits the configuration information 865 to the ED. For example, the configuration information 865 may be transmitted to the ED 110 using LPP.

In one example, the present disclosure describes examples that enable configuration details of the PL RS and/or TF RS to be transmitted from a non-serving cell to the serving cell. The ED may then receive the configuration information, which originated from a non-serving cell, via the serving cell.

In some examples, the serving cell may receive the configuration information of the PL RS and/or TF RS of a non-serving cell from the LMF (e.g., using NRPPa, in the case where the serving cell is a NG-RAN node). In some examples, the serving cell may receive this configuration information directly from the non-serving cell (e.g., using XnAP or F1 AP). This configuration information may be received in response to a request from the serving cell to the non-serving cell (e.g., transmitted via the LMF using NRPPa in the case where the serving cell is a NG-RAN node, or transmitted directly from the serving cell to the non-serving cell using XnAP).

The ED may then receive the configuration information of the PL RS and/or TF RS from the serving cell (e.g., via RRC signaling). Notably, this configuration information may be received by the ED from the serving cell, however the PL RS and/or TF RS is received by the ED from the non-serving cell.

The example provides various mechanisms for communicating the configuration information of the PL RS and/or TF RS between the non-serving cell(s) and the serving cell. In some examples, the LMF may be used as an intermediate node for communicating this configuration information between the non-serving cell(s) and the serving cell.

Figure 9:
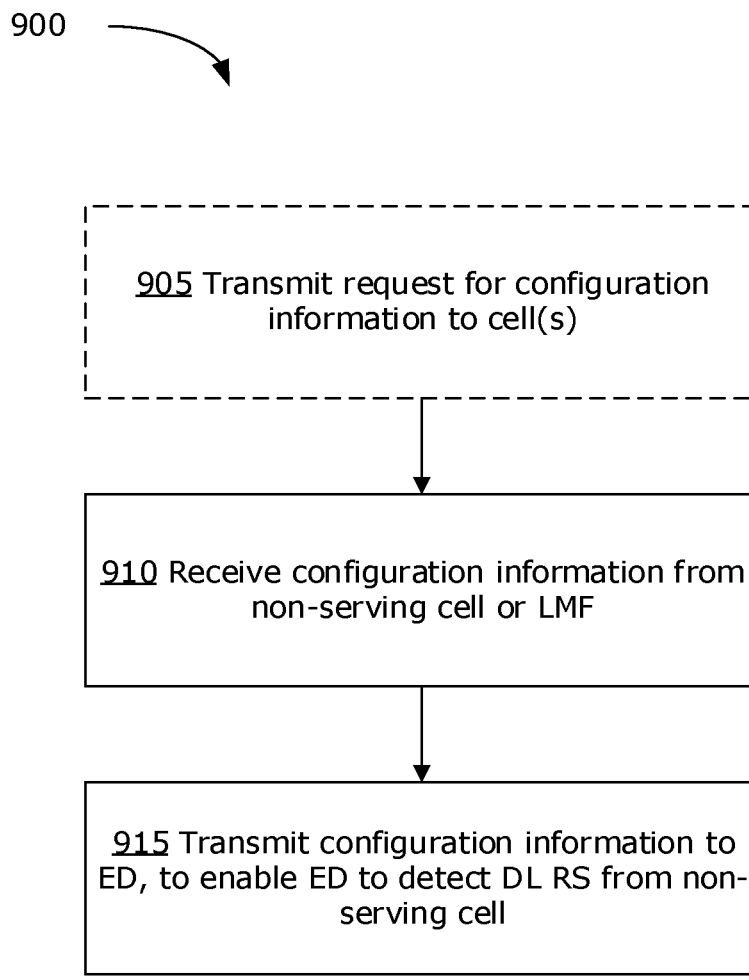
FIG. 9 is a flowchart illustrating an example method for a base station (BS) of a serving cell to provide configuration information to an ED.

FIG. 9 is a flowchart illustrating an example method 900 that may be performed in accordance with the example described above. The method 900 may be implemented in a BS of the serving cell (e.g., using a processing unit of the BS executing instructions stored in a memory of the BS).

FIGS. 10A-10E are example signal flow diagrams illustrating signaling between network entities, which may be used to implement the example described above. FIGS. 10A-10E show signaling performed by the ED 110, a first BS 170*a* in a serving cell (also referred to as the serving cell BS 170*a*), a second BS 170*b* in a non-serving cell (also referred to as the non-serving cell BS 170*b*), and the LMF 135. For simplicity, the present disclosure may refer to signals being transmitted to or from a serving cell or a non-serving cell; however, it should be understood that signaling to and from a cell is handled by the respective BS of that cell. For simplicity, only one serving and one non-serving cell are shown. However, it should be understood that there may be more than one serving and/or non-serving cell.

FIGS. 9 and 10A-10E will be discussed together, for ease of understanding.

At 905, optionally, the BS transmits a request requesting configuration information for PL RS and/or TF RS (generally referred to as DL RS) from a non-serving cell. The request may be transmitted directly to a non-serving cell (1005 in FIGS. 10A, 10B and 10E), or the request may be transmitted to the LMF (1040 in FIGS. 10C and 10D) to be relayed to the non-serving cell.

Figure 10A:
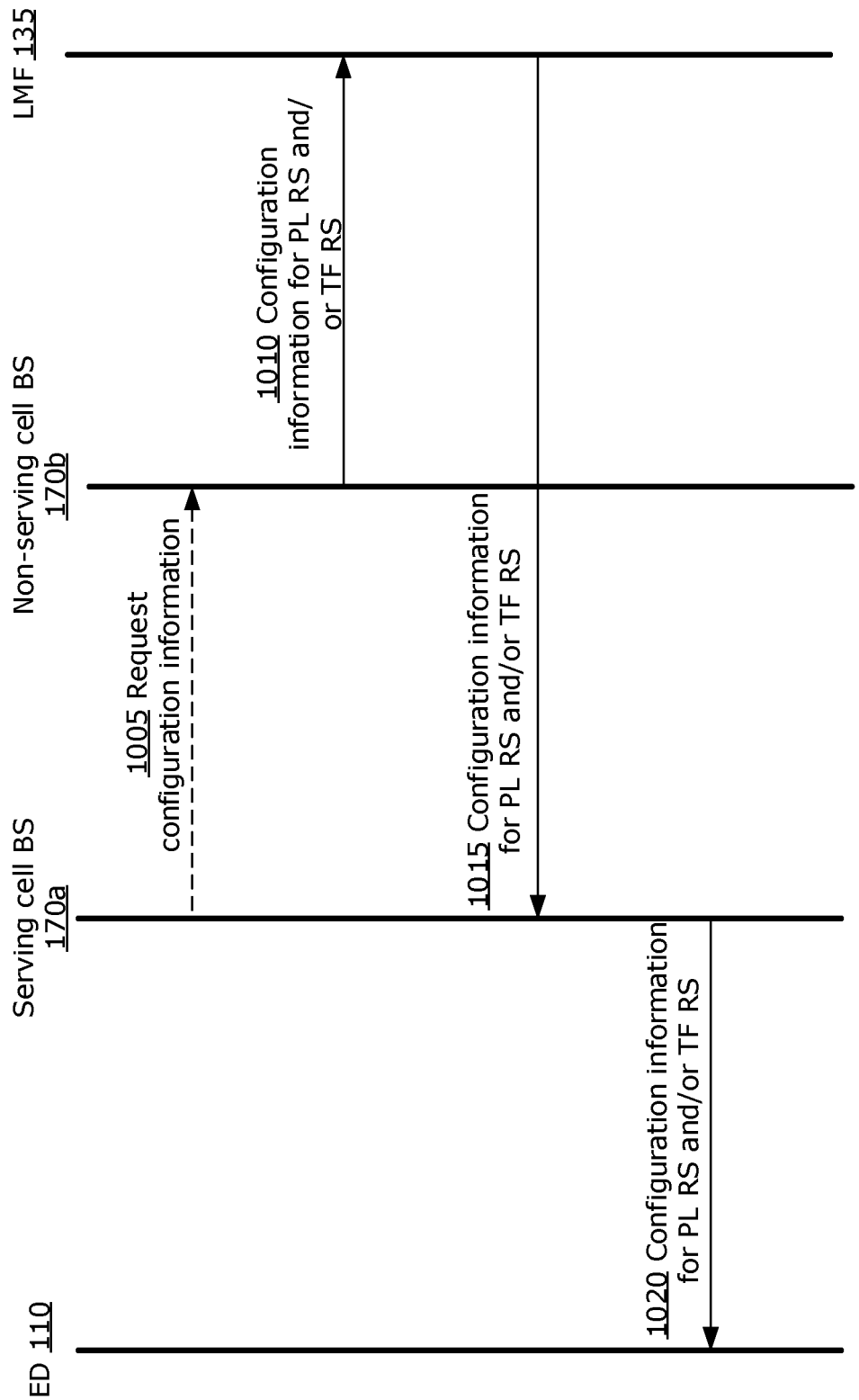
FIGS. 10A-10E are signaling diagrams illustrating example signaling for a serving cell to provide configuration information to an ED.

In the example of FIG. 10A, the non-serving cell transmits DL RS configuration information 1010 to the LMF 135 to be forwarded to the serving cell at 1015.

Figure 10B:
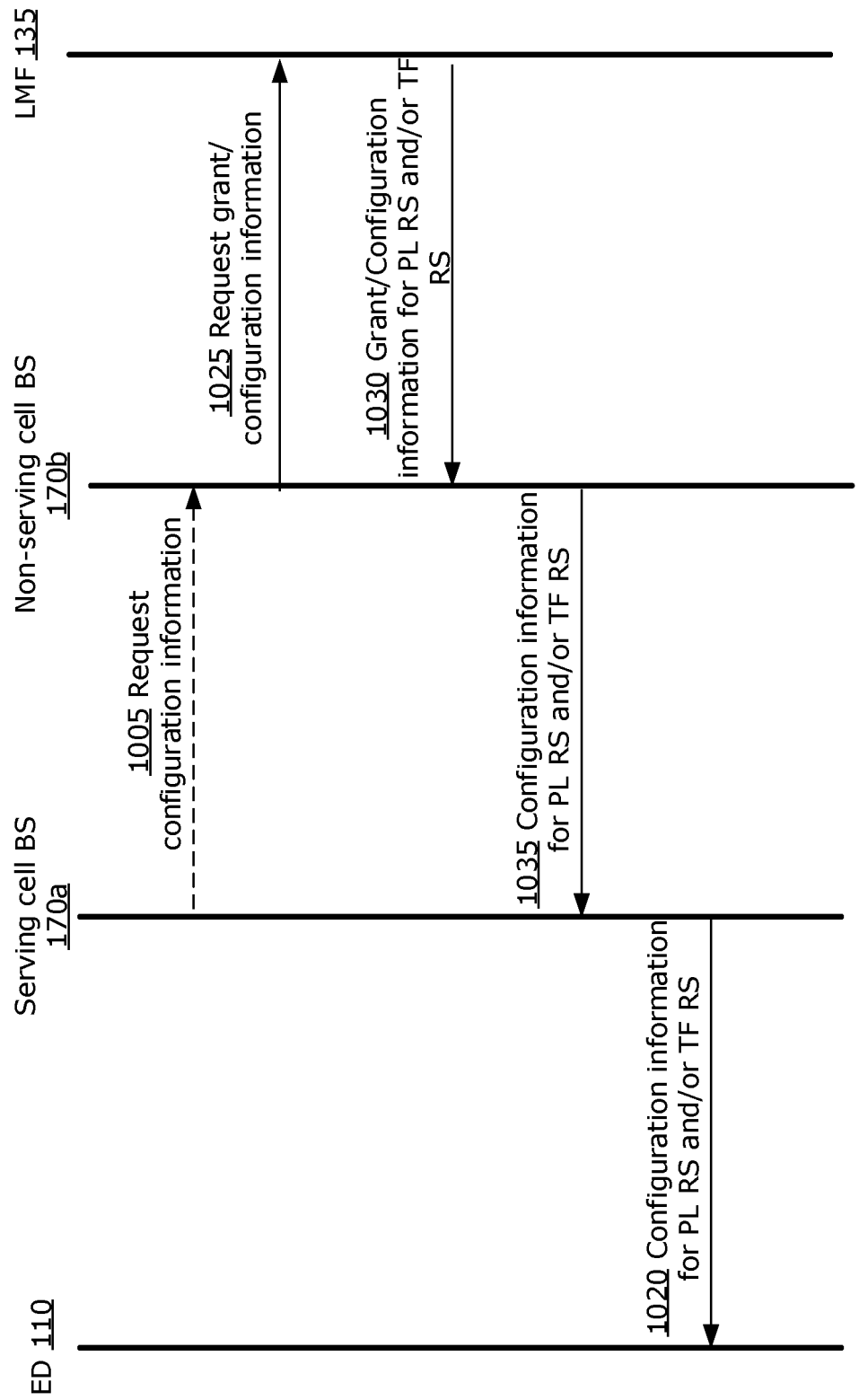

In the example of FIG. 10B, at 1025 the non-serving cell requests a grant for sending configuration information to the serving cell, or requests configuration information from the LMF 135. The LMF 135 provides the requested grant or configuration information 1030. The non-serving cell then transmits the configuration information 1035 to the serving cell.

Figure 10C:
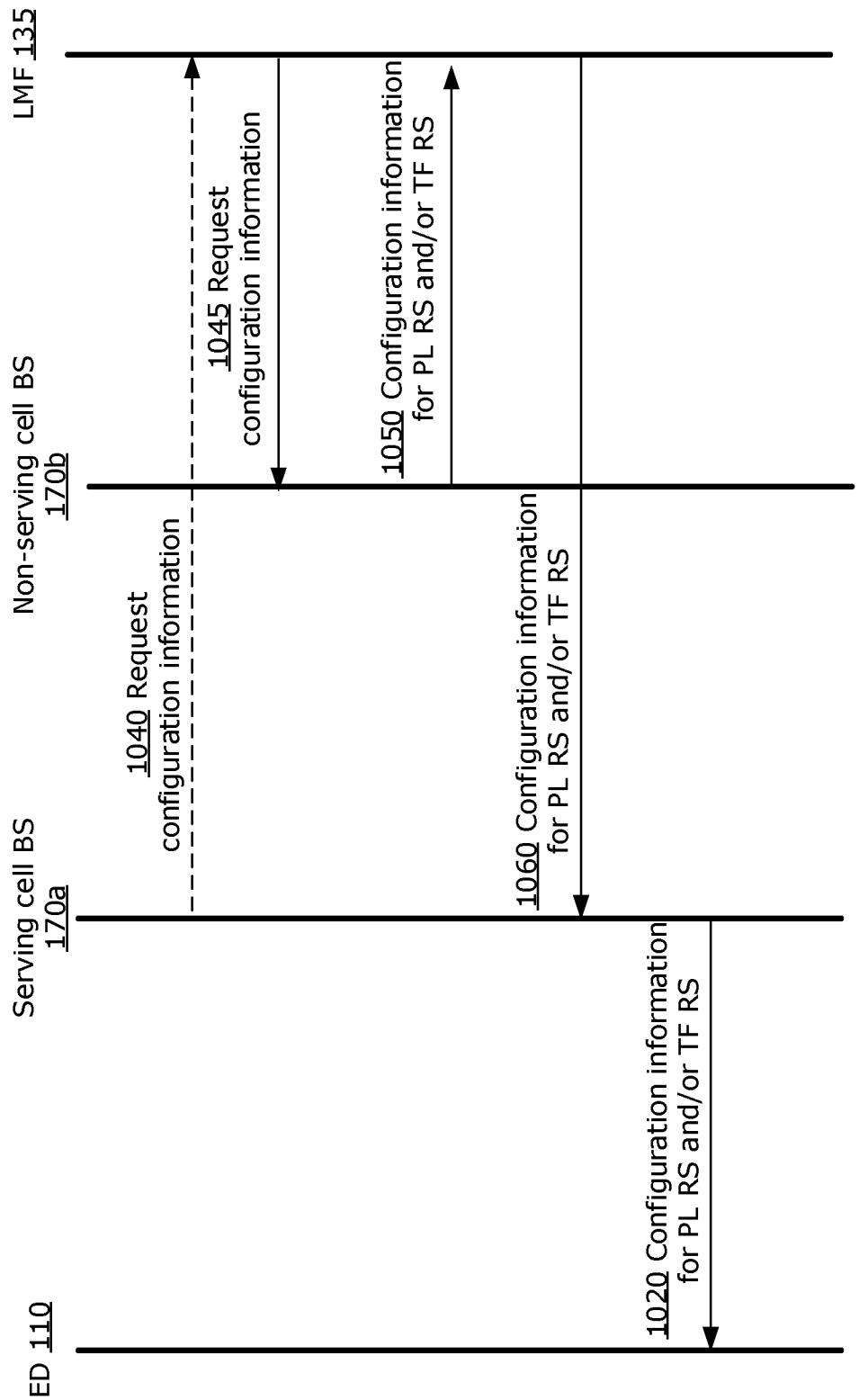

In the example of FIG. 10C, the LMF 135 transmits a request for configuration information 1045 to the non-serving cell. The non-serving cell transmits the configuration information 1050 to the LMF 135, which then relays the configuration information to the serving cell at 1060.

Figure 10D:
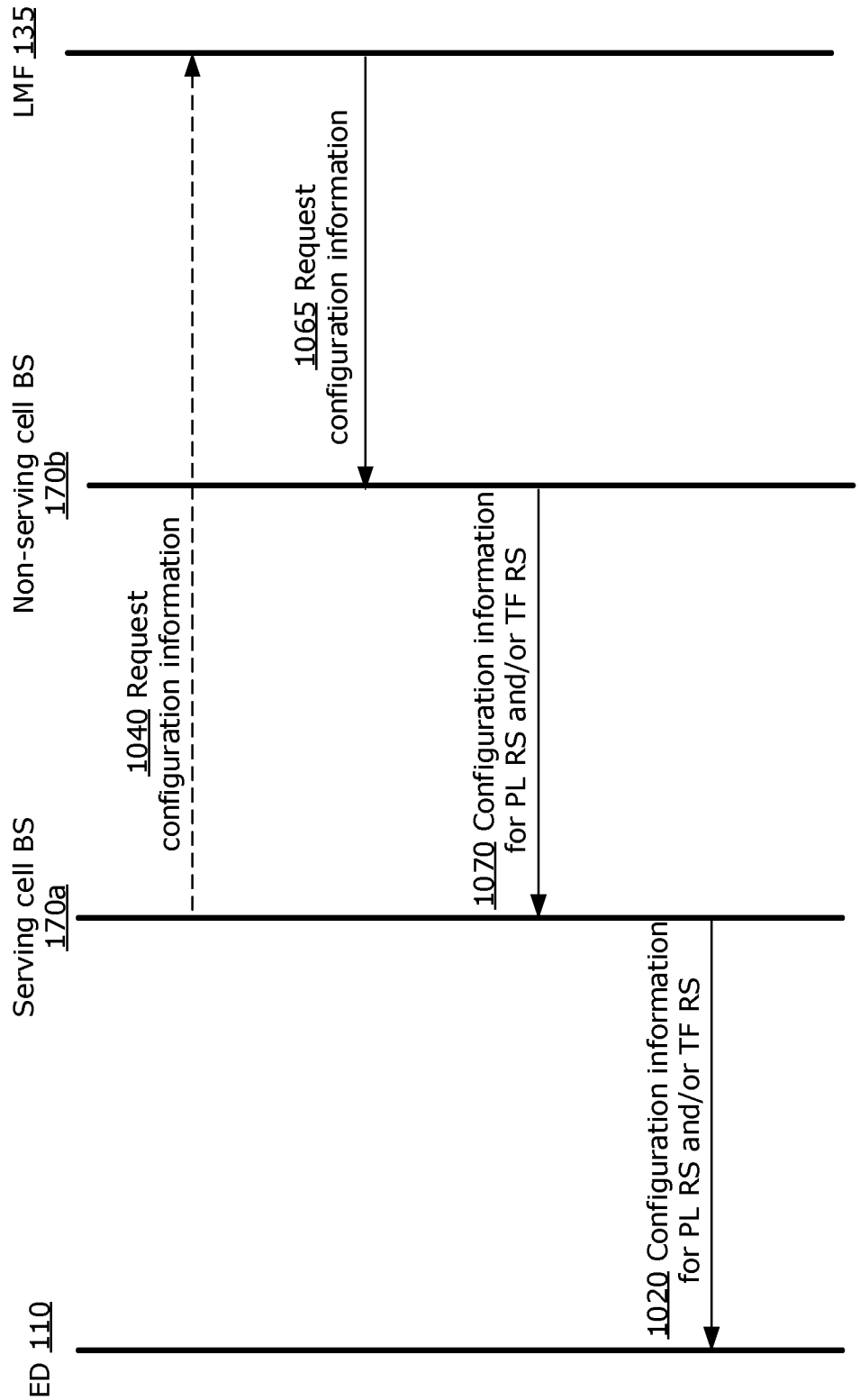

In the example of FIG. 10D, the LMF 135 transmits a request for configuration information 1065 to the non-serving cell. The non-serving cell then directly transmits the configuration information 1070 to the serving cell.

Figure 10E:
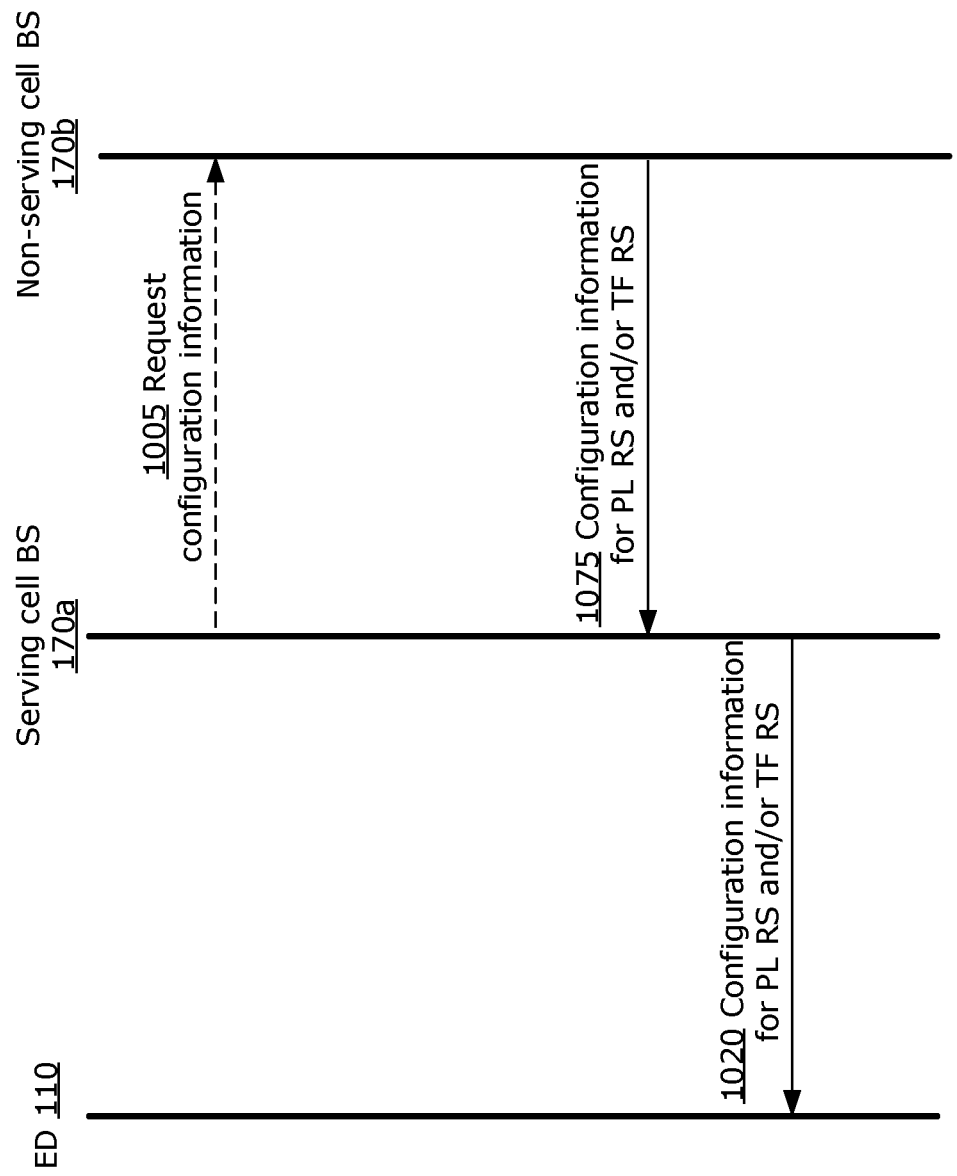

In the example of FIG. 10E, the non-serving cell transmits the configuration information 1075 to the serving cell. The LMF 135 may not be involved in this procedure.

At 910, the BS receives a message from the non-serving cell (1035 in FIG. 10B, 1070 in FIG. 10D, or 1075 in FIG. 10E) or the LMF (1015 in FIG. 10A, or 1060 in FIG. 10C) including the configuration information to enable the ED to receive a DL RS from the non-serving cell. In some examples, the configuration information may be received directly from the non-serving cell if the request (at 905) was transmitted directly to the non-serving cell. The configuration information may be received via the LMF if the request (at 905) was transmitted via the LMF. In other examples, the configuration information may be received directly from the non-serving cell or via the LMF regardless of how the request was transmitted (or if no request was transmitted).

At 915, the BS transmits the configuration information to the ED (1020 in FIGS. 10A-10E).

The various examples described herein may help to enable the ED to properly receive DL RS from a cell (including a serving cell or a non-serving cell), and to determine PL and/or TF for transmission of a SRS to a cell (including a serving cell or a non-serving cell). These examples may enable the SRS to be used for mobility purposes, positioning purposes, or any other application that may require the ED to transmit SRS to a cell (including a serving cell or a non-serving cell).

In some examples, the present disclosure describes a method at an electronic device (ED), the method including: receiving configuration information from a network entity of a serving cell or a location management function (LMF), wherein the configuration information comprises one or more information associated with a positioning reference signal (PRS); detecting a received PRS from the serving cell or a non-serving cell based on the configuration information; and transmitting a sounding reference signal (SRS) to the serving cell or the non-serving cell, according to at least one of a path loss (PL) information and a spatial domain transmission filter (TF) information; wherein the at least one of the PL information and the spatial domain TF information is associated with the PRS.

In some examples, the configuration information may be received via: a radio resource control (RRC) signal from the serving cell; or a LTE positioning protocol (LPP) message from the LMF.

In some examples, the configuration information may include a PRS identifier (ID) field comprising a PRS identification for identifying the PRS from the serving cell or the non-serving cell.

In some examples, the configuration information may include an identifier (ID) field indicating a physical cell ID (PCID) of the serving cell or the non-serving cell, or an ID of a network entity sending the PRS.

In some examples, the configuration information may include a quasi colocation Type-D (QCL-D) field providing information about another configured reference signal that is QCL-D with the PRS, and wherein the ED is enabled to receive the PRS based on a configuration for the configured reference signal.

In some examples, the QCL-D field may include an index of the other configured reference signal.

In some examples, the configuration information may include information indicating at least one of: a New Radio Absolute Radio-Frequency Channel Number (NR ARFCN) for determining a frequency domain location of the PRS; a bandwidth of the PRS; a slot offset of the PRS; a frame offset of the PRS; a symbol offset of the PRS; a number of antenna ports of the PRS; a frame number at which the PRS is transmitted; a muting configuration of the PRS; a frequency hopping configuration of the PRS; or a number of available narrowband for the PRS.

In some examples, the present disclosure describes a method at an electronic device (ED), the method including: receiving configuration information from a network entity of a serving cell or a location management function (LMF), wherein the configuration information comprises one or more information associated with a synchronization signal/physical broadcast channel block (SSB) or a channel state information reference signal (CSI-RS); the configuration information including at least an identifier (ID) field containing an identification of the SSB or CSI-RS, and a cell ID field including a physical cell ID (PCID) of a non-serving cell; detecting a received SSB or CSI-RS from the non-serving cell; and transmitting a sounding reference signal (SRS) to the non-serving cell, according to at least one of a path loss (PL) information and a spatial domain transmission filter (TF) information, wherein the at least one of the PL information and the spatial domain TF information is associated with the SSB or CSI-RS.

In some examples, the configuration information may include only the ID field and the cell ID field.

In some examples, the configuration information may include a quasi colocation Type D (QCL-D) field providing information about another configured reference signal that is QCL-D with the SSB or CSI-RS, and wherein the ED is enabled to receive the SSB or CSI-RS based on a configuration for the configured reference signal.

In some examples, the QCL-D field may include an index of the other configured reference signal.

In some examples, the configuration information may include at least one of: a PCID of a cell associated with the other configured reference signal; a New Radio Absolute Radio-Frequency Channel Number (NR ARFCN) for determining a frequency domain location of the other configured reference signal; or a time domain reference to determine a time domain location of the other configured reference signal.

In some examples, the configuration information may originate from the non-serving cell.

In some examples, the present disclosure describes a method at an electronic device (ED), the method including: obtaining, by the ED, a path loss (PL) information or a spatial domain transmission filter (TF) information based on a second downlink (DL) reference signal (RS) after a first DL RS has not been received during an expected time or timeframe, or in absence of configuration information for receiving the first DL RS; and transmitting a sounding reference signal (SRS), the SRS being transmitted according to the PL information or TF information.

In some examples, the first DL RS may be a positioning reference signal (PRS) or a channel state information-reference signal (CSI-RS).

In some examples, the first DL RS may be a PRS, and the second DL RS may be one of: a detected synchronization signal/physical broadcast channel block (SSB); or a detected CSI-RS.

In some examples, the first DL RS may be a CSI-RS, and the second DL RS may be one of: a detected synchronization signal/physical broadcast channel block (SSB); or a detected PRS.

In some examples, the second DL RS may be detected from a non-serving cell indicated in configuration information for the first DL RL.

In some examples, one of a plurality of detected RSs may be selected as the second DL RS, based on a highest reference signal received power (RSRP).

In some examples, the second DL RS may be a detected SSB used to obtain system information.

In some examples, the second DL RS may be a detected SSB configured for a serving cell.

In some examples, the method may include: receiving configuration information from a network entity of a serving cell or a location management function (LMF), wherein the configuration information comprises one or more information associated with the DL RS.

In some examples, the present disclosure describes a method at a location management function (LMF), the method including: receiving a configuration message from a network entity of a cell, the configuration message comprising one or more information associated with a positioning reference signal (PRS); or the configuration message comprising one or more information associated with a downlink (DL) reference signal (RS); and transmitting the information to an electronic device (ED).

In some examples, the configuration message may be received from the cell in absence of a request from the LMF.

In some examples, the method may include: transmitting a request to the cell, to request the information.

In some examples, the request may include a suggested value for a configuration field.

In some examples, communications between the LMF and the cell may be via New Radio Positioning Protocol A (NRPPa).

In some examples, the information may be transmitted to the ED via LTE Positioning Protocol.

In some examples, the present disclosure describes a method at a base station (BS) of a serving cell, the method including: receiving a configuration message from a non-serving cell or a location management function (LMF), the configuration message comprising one or more information associated with a positioning reference signal (PRS), or the configuration message comprising one or more information associated with a downlink (DL) reference signal (RS); and transmitting the information to an electronic device (ED).

In some examples, the method may include: transmitting a request for the information.

In some examples, the request may be transmitted to the LMF.

In some examples, the request may be transmitted directly to the non-serving cell.

In some examples, communications between the serving cell and the non-serving cell may be via Xn Application Protocol (XnAP) or F1 Application Protocol (F1 AP).

In some examples, communications between the serving cell and the LMF may be via New Radio Positioning Protocol A (NRPPa).

In some examples, the present disclosure describes an apparatus including: a processing unit configured to execute instructions to cause the apparatus to perform any of the methods described herein.

In some examples, the present disclosure describes a network entity including: a processing unit configured to execute instructions to implement a location management function (LMF) for performing any of the methods described herein.

In some examples, the present disclosure describes a base station including: a processing unit configured to execute instructions to cause the base station to perform any of the methods described herein.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

What is claimed is:

1. A method comprising:
receiving, by a user equipment (UE), configuration information associated with a downlink (DL) reference signal (RS) in a first communication from a location management function (LMF) via LTE positioning protocol (LPP);
receiving, by the UE, in a second communication from a serving cell for the UE via radio resource control (RRC), an identifier (ID) of the DL RS and a cell ID of a cell that originates the DL RS, wherein the configuration information received in the first communication also includes the ID of the DL RS and the cell ID; and
transmitting, by the UE, a sounding RS (SRS) to the cell identified by the cell ID, according to path loss (PL) information or spatial domain transmission filter (TF) information associated with the DL RS, wherein the cell that originates the DL RS is different from the serving cell.

2. The method of claim 1, wherein the DL RS is a DL positioning RS (PRS), and wherein the configuration information associated with the DL RS includes at least one of:
a resource ID of the DL PRS,
the cell ID of the cell that originates the DL PRS,
a quasi colocation-Type-D (QCL-D) field providing information about another configured RS that is QCL-D with the DL PRS,
a New Radio Absolute Radio-Frequency Channel Number (NR ARFCN) for determining a frequency domain location of the DL PRS,
a bandwidth of the DL PRS,
a slot offset of the DL PRS,
a frame offset of the DL PRS,
a symbol offset of the DL PRS,
a muting configuration of the DL PRS,
a periodicity and offset of the DL PRS, or
a scrambling ID of the DL PRS.

3. The method of claim 1, wherein the DL RS is a DL synchronization signal/physical broadcast channel block (SSB), and wherein the configuration information associated with the DL RS includes at least one of:
an SSB index of the DL SSB,
the cell ID of the cell that originates the DL SSB, or
one or more parameters locating the DL SSB in time-frequency domain.

4. The method of claim 1, wherein the configuration information associated with the DL RS is received to enable the UE to use the DL RS for information other than PL and spatial domain TF, and wherein the second communication is later than the first communication and enables the UE to use the DL RS for PL information or spatial domain TF information.

5. The method of claim 1, wherein the configuration information associated with the DL RS is received to enable the UE to use the DL RS for PL information or spatial domain TF information.

6. The method of claim 5, wherein the DL RS is a DL PRS, and wherein the configuration information associated with the DL RS includes at least one of:
a resource ID of the DL PRS,
the cell ID of the cell that originates the DL PRS,
a QCL-D field providing information about another configured RS that is QCL-D with the DL PRS,
an NR ARFCN for determining a frequency domain location of the DL PRS,
a bandwidth of the DL PRS,
a slot offset of the DL PRS,
a frame offset of the DL PRS,
a symbol offset of the DL PRS,
a muting configuration of the DL PRS,
a periodicity and offset of the DL PRS, or
a scrambling ID of the DL PRS.

7. The method of claim 5, wherein the DL RS is a DL SSB, and wherein the configuration information includes at least one of:
an SSB index of the DL SSB,
the cell ID of the cell that originates the DL SSB, or
one or more parameters locating the DL SSB in time-frequency domain.

8. An apparatus comprising:
at least one processor; and
a non-transitory computer-readable storage medium storing programming, the programming including instructions that, when executed by the at least one processor, cause the apparatus to:
receive configuration information associated with a downlink (DL) reference signal (RS) in a first communication from a location management function (LMF) via LTE positioning protocol (LPP);
receive in a second communication from a serving cell for the apparatus via radio resource control (RRC), an identifier (ID) of the DL RS and a cell ID of a cell that originates the DL RS, wherein the configuration information received in the first communication also includes the ID of the DL RS and the cell ID; and
transmit a sounding RS (SRS) to the cell identified by the cell ID, according to path loss (PL) information or spatial domain transmission filter (TF) information associated with the DL RS, wherein the cell that originates the DL RS is different from the serving cell.

9. The apparatus of claim 8, wherein the DL RS is a DL positioning RS (PRS), and wherein the configuration information associated with the DL RS includes at least one of:
a resource ID of the DL PRS,
the cell ID of the cell that originates the DL PRS,
a quasi colocation-Type-D (QCL-D) field providing information about another configured RS that is QCL-D with the DL PRS,
a New Radio Absolute Radio-Frequency Channel Number (NR ARFCN) for determining a frequency domain location of the DL PRS,
a bandwidth of the DL PRS,
a slot offset of the DL PRS,
a frame offset of the DL PRS,
a symbol offset of the DL PRS,
a muting configuration of the DL PRS,
a periodicity and offset of the DL PRS, or
a scrambling ID of the DL PRS.

10. The apparatus of claim 8, wherein the DL RS is a DL synchronization signal/physical broadcast channel block (SSB), and wherein the configuration information associated with the DL RS includes at least one of:
an SSB index of the DL SSB,
the cell ID of the cell that originates the DL SSB, or
one or more parameters locating the DL SSB in time-frequency domain.

11. The apparatus of claim 8, wherein the configuration information associated with the DL RS is received to enable the apparatus to use the DL RS for information other than PL and spatial domain TF, and wherein the second communication is later than the first communication and enables the apparatus to use the DL RS for PL information or spatial domain TF information.

12. The apparatus of claim 8, wherein the configuration information associated with the DL RS is received to enable the apparatus to use the DL RS for PL information or spatial domain TF information.

13. The apparatus of claim 12, wherein the DL RS is a DL PRS, and wherein the configuration information associated with the DL RS includes at least one of:
a resource ID of the DL PRS,
the cell ID of the cell that originates the DL PRS,
a QCL-D field providing information about another configured RS that is QCL-D with the DL PRS,
an NR ARFCN for determining a frequency domain location of the DL PRS,
a bandwidth of the DL PRS,
a slot offset of the DL PRS,
a frame offset of the DL PRS,
a symbol offset of the DL PRS,
a muting configuration of the DL PRS, a periodicity and offset of the DL PRS, or
a scrambling ID of the DL PRS.

14. The apparatus of claim 12, wherein the DL RS is a DL SSB, and wherein the configuration information includes at least one of:
   an SSB index of the DL SSB,
   the cell ID of the cell that originates the DL SSB, or
   one or more parameters locating the DL SSB in time-frequency domain.

15. A non-transitory computer-readable medium having instructions stored thereon that, when executed by an apparatus, cause the apparatus to perform operations, the operations comprising:
   receiving configuration information associated with a downlink (DL) reference signal (RS) in a first communication from a location management function (LMF) via LTE positioning protocol (LPP);
   receiving in a second communication from a serving cell for the apparatus via radio resource control (RRC), an identifier (ID) of the DL RS and a cell ID of a cell that originates the DL RS, wherein the configuration information received in the first communication also includes the ID of the DL RS and the cell ID; and
   transmitting a sounding RS (SRS) to the cell identified by the cell ID, according to path loss (PL) information or spatial domain transmission filter (TF) information associated with the DL RS, wherein the cell that originates the DL RS is different from the serving cell.

16. The non-transitory computer-readable medium of claim 15, wherein the DL RS is a DL positioning RS (PRS), and wherein the configuration information associated with the DL RS includes at least one of:
   a resource ID of the DL PRS,
   the cell ID of the cell that originates the DL PRS,
   a quasi colocation-Type-D (QCL-D) field providing information about another configured RS that is QCL-D with the DL PRS,
   a New Radio Absolute Radio-Frequency Channel Number (NR ARFCN) for determining a frequency domain location of the DL PRS,
   a bandwidth of the DL PRS,
   a slot offset of the DL PRS,
   a frame offset of the DL PRS,
   a symbol offset of the DL PRS,
   a muting configuration of the DL PRS,
   a periodicity and offset of the DL PRS, or
   a scrambling ID of the DL PRS.

17. The non-transitory computer-readable medium of claim 15, wherein the DL RS is a DL synchronization signal/physical broadcast channel block (SSB), and wherein the configuration information associated with the DL RS includes at least one of:
   an SSB index of the DL SSB,
   the cell ID of the cell that originates the DL SSB, or
   one or more parameters locating the DL SSB in time-frequency domain.

18. The non-transitory computer-readable medium of claim 15, wherein the configuration information associated with the DL RS is received to enable the apparatus to use the DL RS for information other than PL and spatial domain TF, and wherein the second communication is later than the first communication and enables the apparatus to use the DL RS for PL information or spatial domain TF information.

19. The non-transitory computer-readable medium of claim 15, wherein the configuration information associated with the DL RS is received to enable the apparatus to use the DL RS for PL information or spatial domain TF information.

20. A system comprising:
   a location management function (LMF) configured to send configuration information associated with a downlink (DL) reference signal (RS) in a first communication to a user equipment (UE) via LTE positioning protocol (LPP);
   a first base station of a serving cell configured to send to the UE via radio resource control (RRC), an identifier (ID) of the DL RS and a cell ID of a cell that originates the DL RS in a second communication, wherein the configuration information received in the first communication also includes the ID of the DL RS and the cell ID; and
   a second base station of the cell identified by the cell ID configured to receive a sounding RS (SRS) sent from the UE according to path loss (PL) information or spatial domain transmission filter (TF) information associated with the DL RS, wherein the cell that originates the DL RS is different from the serving cell.

* * * * *